United States Patent
Sun et al.

(10) Patent No.: US 9,952,090 B2
(45) Date of Patent: Apr. 24, 2018

(54) DETECTING APPARATUS AND DETECTING METHOD THEREOF

(75) Inventors: Ching-Cherng Sun, Taoyuan County (TW); Yeh-Wei Yu, Taoyuan County (TW); Yen-Lin Chen, Nantou County (TW); Wei-Hsin Chen, Taichung (TW)

(73) Assignee: National Central University, Jhongli, Taoyuan County (TW)

( * ) Notice: Subject to any disclaimer, the term of this patent is extended or adjusted under 35 U.S.C. 154(b) by 819 days.

(21) Appl. No.: 13/608,288

(22) Filed: Sep. 10, 2012

(65) Prior Publication Data
US 2013/0100280 A1 Apr. 25, 2013

(30) Foreign Application Priority Data
Oct. 21, 2011 (TW) .............................. 100138395 A

(51) Int. Cl.
*G01J 1/04* (2006.01)
*G01J 1/02* (2006.01)
*G01J 1/42* (2006.01)

(52) U.S. Cl.
CPC .......... *G01J 1/0403* (2013.01); *G01J 1/0266* (2013.01); *G01J 1/0474* (2013.01); *G01J 2001/4247* (2013.01); *G01J 2001/4252* (2013.01)

(58) Field of Classification Search
CPC ..... H04N 7/18; G06F 3/0488; G06F 3/04883; G06F 3/0416; G06F 3/04886;
(Continued)

(56) References Cited

U.S. PATENT DOCUMENTS 5,834,767 A * 11/1998 Hasegawa ............. G03F 9/7026
250/237 G
6,774,988 B2 8/2004 Stam et al.
(Continued)

FOREIGN PATENT DOCUMENTS

CN 2916601 6/2007
CN 101046386 A 10/2007
(Continued)

OTHER PUBLICATIONS

Wei-Hsin Chen et al., "Whole Field Intensity Distribution Measurement bu Imaging System", i-ONE 2011, published on Oct. 22, 2011. 40 pages.
(Continued)

*Primary Examiner* — Mohammed Rahaman
*Assistant Examiner* — Kehinde O Abimbola
(74) *Attorney, Agent, or Firm* — Muncy, Geissler, Olds & Lowe, P.C.

(57) ABSTRACT

A detecting apparatus for detecting an object includes at least a screen, at least a detecting unit and at least a holding unit. The screen is partial light-permeable and has a first surface and an opposite second surface. The object is disposed adjacent to the first surface of the screen. The detecting unit is disposed corresponding to the object and located adjacent to the second surface of the screen. The holding unit holds the relative distances between the screen, the object and the detecting unit. The detecting unit captures the image of the second surface of the screen so as to calculate the optical field distribution of the object. The detecting apparatus can measure the optical field distribution of an object quickly and has the advantages of low cost and high accuracy.

28 Claims, 18 Drawing Sheets

(58) Field of Classification Search
CPC ........ G06F 3/017; G06F 3/0412; G06F 3/011;
G06F 3/044; G06F 3/04842; G06F
3/0485; G06F 2203/04101; G06F 3/016;
G06F 3/0482; G06F 1/163
See application file for complete search history.

(56) References Cited

U.S. PATENT DOCUMENTS

| | | | | |
|---|---|---|---|---|
| 7,233,400 | B2* | 6/2007 | Ueki | 356/497 |
| 7,847,927 | B2* | 12/2010 | Chikamatsu et al. | 356/237.4 |
| 7,869,013 | B2* | 1/2011 | Wang | G01N 21/553 |
| | | | | 356/73 |
| 7,907,261 | B2 | 3/2011 | Inaba | |
| 8,148,693 | B2* | 4/2012 | Ryge | G01T 1/167 |
| | | | | 250/361 R |
| 8,401,147 | B2* | 3/2013 | Ryge | G01T 1/167 |
| | | | | 250/361 R |
| 8,537,333 | B2* | 9/2013 | Freimann | G03F 7/70258 |
| | | | | 355/30 |
| 8,687,205 | B2* | 4/2014 | Onishi | 356/614 |
| 8,860,694 | B2* | 10/2014 | Hwang | G02B 6/0068 |
| | | | | 345/156 |
| 2002/0041377 | A1* | 4/2002 | Hagiwara | G03F 7/706 |
| | | | | 356/399 |
| 2003/0173525 | A1* | 9/2003 | Seville | G01N 21/6428 |
| | | | | 250/458.1 |
| 2006/0044567 | A1* | 3/2006 | Ueki | 356/497 |
| 2007/0070201 | A1* | 3/2007 | Yokomitsu | G06T 7/246 |
| | | | | 348/169 |
| 2008/0004633 | A1* | 1/2008 | Arata et al. | 606/130 |
| 2008/0099662 | A1* | 5/2008 | Musiel | G01J 1/08 |
| | | | | 250/205 |
| 2008/0163688 | A1* | 7/2008 | Wang | G01N 21/553 |
| | | | | 73/580 |
| 2008/0204736 | A1* | 8/2008 | Chikamatsu et al. | 356/237.4 |
| 2008/0262812 | A1* | 10/2008 | Arata et al. | 703/11 |
| 2010/0066662 | A1* | 3/2010 | Tomisawa | G03B 37/04 |
| | | | | 345/156 |
| 2010/0151474 | A1* | 6/2010 | Afanasyev | G01N 21/253 |
| | | | | 435/6.13 |
| 2010/0254142 | A1* | 10/2010 | Lai | F21V 5/002 |
| | | | | 362/259 |
| 2010/0271627 | A1* | 10/2010 | Chikamatsu et al. | 356/237.4 |
| 2011/0122095 | A1* | 5/2011 | Tsai | G02B 6/0076 |
| | | | | 345/175 |
| 2011/0164232 | A1* | 7/2011 | Freimann | G03F 7/70258 |
| | | | | 355/67 |
| 2011/0199531 | A1* | 8/2011 | Yoshikawa | G02B 27/646 |
| | | | | 348/340 |
| 2011/0253898 | A1* | 10/2011 | Ryge | G01T 1/167 |
| | | | | 250/361 R |
| 2011/0279361 | A1* | 11/2011 | Onishi | 345/156 |
| 2011/0279827 | A1* | 11/2011 | Onishi | 356/614 |
| 2012/0105614 | A1* | 5/2012 | Wu | G06K 9/00046 |
| | | | | 348/77 |
| 2012/0217408 | A1* | 8/2012 | Ryge | G01T 1/167 |
| | | | | 250/366 |
| 2012/0229422 | A1* | 9/2012 | Hwang | G02B 6/0068 |
| | | | | 345/175 |

FOREIGN PATENT DOCUMENTS

| | | |
|---|---|---|
| CN | 200979488 | 11/2007 |
| CN | 101187592 A | 5/2008 |
| CN | 101608949 A | 12/2009 |
| JP | 64-38617 | 2/1989 |
| WO | WO-2011/024232 A1 | 3/2011 |

OTHER PUBLICATIONS

Yeh-Wei Yu et al., The Measurement of Cosine Corrected Bidirectional Scattering Distribution Function, OIT 2011, published on Nov. 7, 2011. 44 pages.

Yeh-Wei Yu et al. "Optical Distribution of LEDs Measured by Screen Imaging Synthesis Method", SPIE Optics & Photonics 2012, published on Aug. 13, 2012. 45 pages.

* cited by examiner

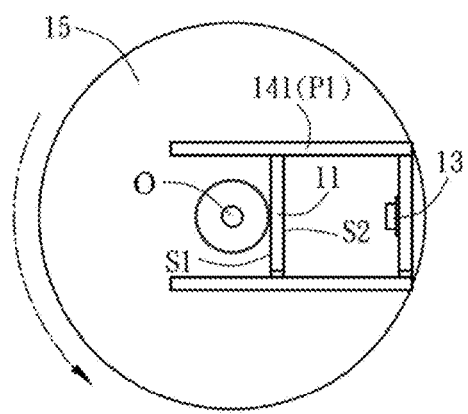 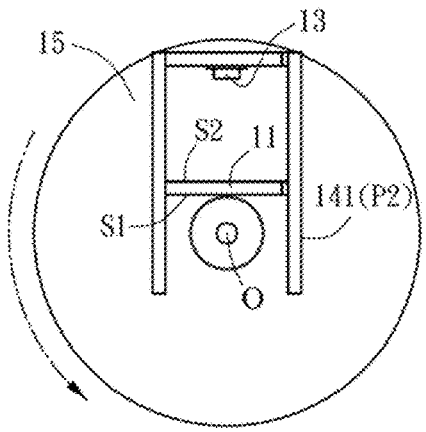
FIG. 3A                FIG. 3B
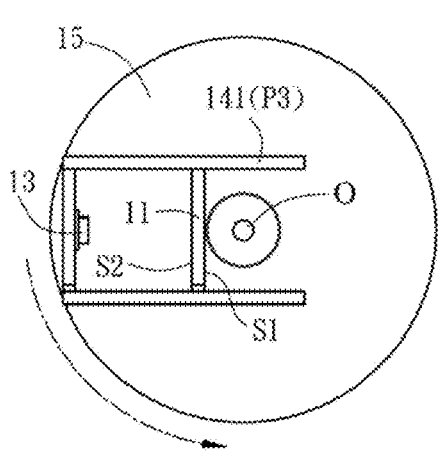 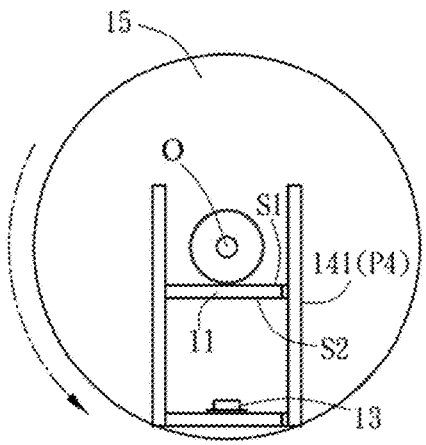
FIG. 3C                FIG. 3D

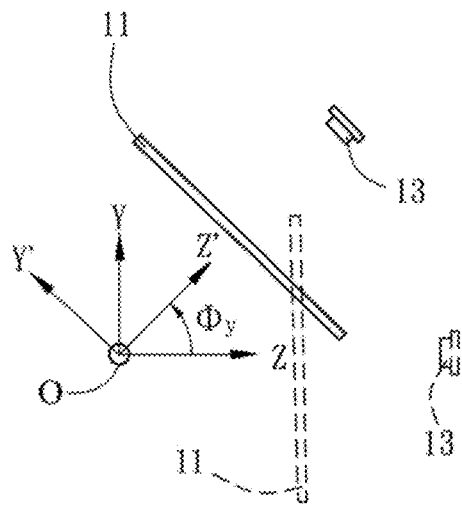
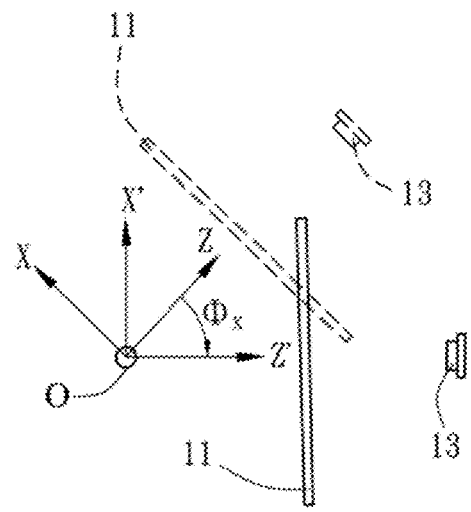
FIG. 5A    FIG. 5B
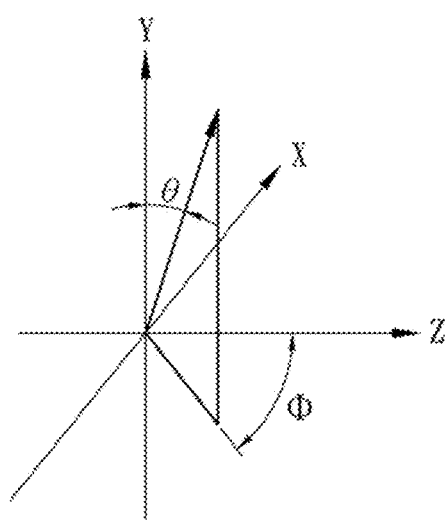
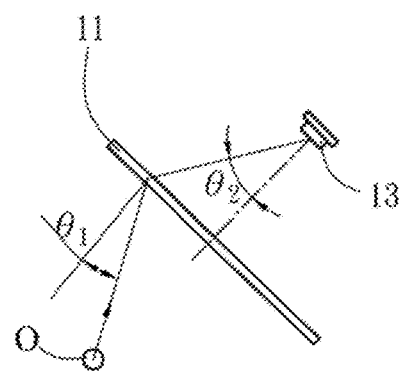
FIG. 5C    FIG. 5D

DETECTING APPARATUS AND DETECTING METHOD THEREOF

CROSS REFERENCE TO RELATED APPLICATIONS

This Non-provisional application claims priority under 35 U.S.C. § 119(a) on Patent Application No(s). 100138395 filed in Taiwan, Republic of China on Oct. 21, 2011, the entire contents of which are hereby incorporated by reference.

BACKGROUND OF THE INVENTION

Field of Invention

The present invention relates to a detecting apparatus and a detecting method, and in particular, to a detecting apparatus and a detecting method for detecting optical field distribution.

Related Art

As the continuous improvements of manufacturing processes and materials, various kinds of light sources, such as LED (light-emitting diode), are developed recently. Due to the manufacturing processes, each light source or light source product has individual unique light intensity distribution, so that optical designer usually needs the optical field distribution thereof to proceed with the further precise design and optical simulation, thereby fabricating the production in desired specification. Thus, it is necessary to measure the optical field distribution of various light sources and products in advance.

In general, the optical field distribution of the light source is measured by far field detection directly. The detection distance is suggested to be greater than 10 times of the size of the light source or lamp. The angle field of the light intensity is not changed as the distance is larger than the suggested detection distance. The conventional art usually utilizes a photometer to detect the far-field light intensity distribution so as to establish the equivalent optical field distribution of the light source.

In addition, the utilized photometer is usually a goniophotometer, which needs a certain detecting time for performing multiple scan procedures. If the detection is performed by image concept, it is possible to sufficiently decrease the detection time. At present, there are some products (e.g. Imagine Spheres, Radiant Imaging Co.) that can detect the light intensity distribution by utilizing image concept. Although this new detection apparatus has the advantages of fast detection and short detection time, however, it needs a coating with perfect Lambertian property, so the cost is very expansive.

Therefore, it is an important subject to provide a detection apparatus and a detection method that can detect the optical field distribution and total flux of a light source with low cost and high accuracy (compared with the conventional photometer and integrating sphere).

SUMMARY OF THE INVENTION

In view of the foregoing, an objective of the present invention is to provide a detection apparatus and a detection method that can detect the optical field distribution and total flux of a light source with low cost and high accuracy (compared with the conventional photometer and integrating sphere).

To achieve the above objective, the present invention discloses a detecting apparatus for detecting an object. The detecting apparatus includes at least a screen, at least a detecting unit, and at least a holding unit. The screen is partial light-permeable and has a first surface and a second surface opposite to each other, and the object is disposed adjacent to the first surface of the screen. The detecting unit is disposed corresponding to the object and located adjacent to the second surface of the screen. The holding unit is configured for holding relative distances between the screen, the object and the detecting unit. The detecting unit captures an image of the second surface of the screen so as to calculate an optical field distribution of the object.

In one embodiment, the object comprises a light source or an optical film.

In one embodiment, the material of the screen comprises paper, cloth, fiber, plastic, flannel paper, glass, acrylic, or diffusion sheet.

In one embodiment, the screen comprises a screen body and a carbon layer or a printing layer, and the carbon layer or the printing layer is disposed on the first surface.

In one embodiment, the carbon layer or the printing layer comprises a plurality of recesses for exposing the screen body.

In one embodiment, the screen further comprises a transparent substrate closely attached to the second surface.

In one embodiment, the detecting unit comprises a luminance meter, a lux meter, a power meter, a camera, or a spectrometer.

In one embodiment, the detecting unit further comprises a Galvo mirror assembly for scanning the image of the second surface of the screen.

In one embodiment, the optical field distribution comprises a light intensity distribution, a color distribution, or a spectrum distribution.

In one embodiment, the holding unit comprises a moveable frame having a plurality of positions with respect to the object.

In one embodiment, the detecting unit captures a plurality of images of the second surface of the screen when the moveable frame is respectively located at the positions.

In one embodiment, the optical field distribution of the object is calculated according to the captured images.

In one embodiment, when the numbers of the screens, the detecting units and the holding units are more than 1, the detecting units capture the images of the second surfaces of the screens.

In one embodiment, the holding unit further comprises a shaft for rotating the moveable frame, so that the moveable frame has the positions with respect to the object.

In one embodiment, the detecting apparatus further includes a cover, and the screen, the moveable frame, the detecting unit and the object are disposed in the cover.

In one embodiment, the cover has a track, and the moveable frame moves along the track.

In one embodiment, the detecting apparatus floater includes a rotating unit for carrying and rotating the object so as to change an angle of the object toward the screen or change an angle between the object and an incident light.

In one embodiment, the detecting apparatus further includes a rotating unit for carrying and rotating the screen, the detecting unit and the holding unit so as to change an angle of the object toward the screen.

In one embodiment, the detecting apparatus further includes a calculating unit for performing a light intensity correction and conversion of the images captured by the detecting unit and performing a coordinate transform to the same coordinate system.

In one embodiment, the detecting apparatus further includes a calculating unit for performing a light intensity correction and conversion of the images captured by the detecting unit, performing a coordinate transform to the same coordinate system, and calculating their total flux.

In one embodiment, when the object is an optical film, the detecting unit further comprises a light source for emitting a light beam to the optical film.

In one embodiment, when the object is an optical film, the screen, the cover or the holding unit has a through hole allowing a light source to irradiate the optical film.

To achieve the above objective, the present invention also discloses a method for detecting an optical field distribution of an object. The method is applied to a detecting apparatus having at least a screen and at least a detecting unit. The screen is partial light-permeable and has a first surface and a second surface opposite to each other. The object is disposed adjacent to the first surface of the screen. The detecting unit is disposed corresponding to the object and located adjacent to the second surface of the screen. The method includes the steps of capturing an image of the second surface of the screen by the detecting unit; changing an angle of the object toward the screen; capturing another image of the second surface of the screen by the detecting unit; and calculating the optical field distribution and a total flux of the object according to the captured images.

In one embodiment, the method further includes a step of: performing calibration and correction for the images captured by the detecting unit.

In one embodiment, the method further includes a step of: performing an intensity conversion for data of the images, and performing a coordinate transform to the same coordinate system.

In one embodiment, the optical field distribution comprises a light intensity distribution, a color distribution, or a spectrum distribution.

In one embodiment, the method further includes a step of: measuring a standard light source with a known total flux.

In one embodiment, when the numbers of the screens and the detecting units are more than 1, the detecting units capture the images of the second surfaces of the screens.

In one embodiment, an angle of the object toward the screen is changed by a moveable frame and/or a rotating unit.

In one embodiment, the rotating unit carries and rotates the object, or carries and rotates the screen, the detecting unit and the moveable frame.

In one embodiment, after calculating the optical field distribution of the object according to the captured images, the method further includes a step of: calculating the total flux by integration.

To achieve the above objective, the present invention further discloses a method for detecting an optical field distribution of an object. The method is applied to a detecting apparatus having at least a screen and at least a detecting unit. The screen is partial light-permeable and has a first surface and a second surface opposite to each other. The object is disposed adjacent to the first surface of the screen, and the detecting unit is disposed corresponding to the object and located adjacent to the second surface of the screen. The method includes the steps of: capturing an image of the second surface of the screen by the detecting unit; changing an angle of the object toward the screen; capturing another image of the second surface of the screen by the detecting unit; performing an intensity conversion for data of the images, and performing a coordinate transform to the same coordinate system; and calculating the optical field distribution and a total flux of the object according to the captured images.

As mentioned above, the detecting apparatus and method of the invention detects an object disposed adjacent to the first surface of the screen, and the detecting unit is disposed corresponding to the object and located adjacent to the second surface of the screen. Besides, the holding unit holds the relative distances between the screen, the object and the detecting unit, and the detecting unit captures the image of the second surface of the screen for calculating the optical field distribution of the object. Accordingly, the detecting unit can capture the optical field distributions of the light emitted by the object from different angles or directions, thereby obtaining the optical field distributions of the object in at least half-sphere domain. Therefore, the detecting apparatus and method of the invention can replace the commercialized goniophotometer and integrating sphere, and have the advantages of fast and convenient detection and lower cost.

Moreover, regarding to the application, the detecting apparatus of the invention can further replace the conventional method for detecting the total flux of the light source by the integrating sphere. After some proper modifications, the detecting apparatus of the invention can further the BSDF of an optical film.

BRIEF DESCRIPTION OF THE DRAWINGS

The invention will become more fully understood from the detailed description and accompanying drawings, which are given for illustration only, and thus are not limitative of the present invention, and wherein:

FIGS. 3A to 3D are top views of the holding unit of the detecting apparatus in different positions;

FIGS. 5A to 5C are schematic diagrams showing that the coordinates are transformed to the same coordinate system;

FIG. 5D is a schematic diagram showing the relative geometric positions of the source, the screen and the detecting unit of the invention;

DETAILED DESCRIPTION OF THE INVENTION

The present invention will be apparent from the following detailed description, which proceeds with reference to the accompanying drawings, wherein the same references relate to the same elements.

Figure 1:
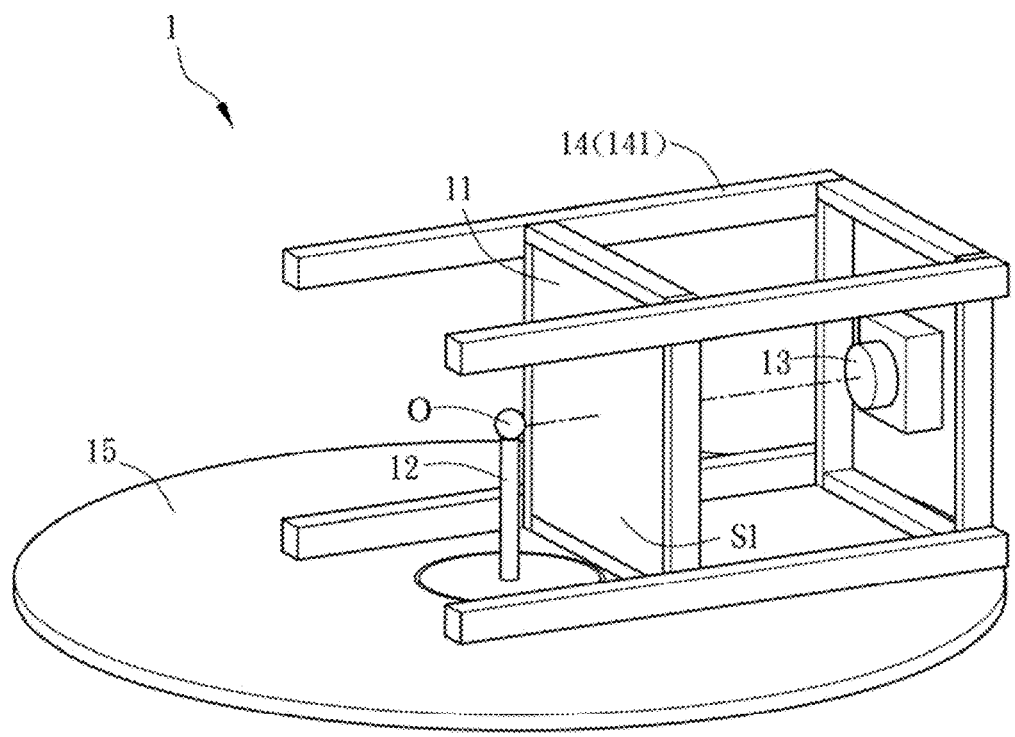
FIG. 1 is a schematic diagram of a detecting apparatus according to a first embodiment of the invention.

FIG. 1 is a schematic diagram of a detecting apparatus 1 according to a first embodiment of the invention. With reference to FIG. 1, a detecting apparatus 1 of the invention is used for detecting an object and includes at least a screen 11, a carrier 12 for carrying the object, at least a detecting unit 13, and at least a holding unit 14. In this embodiment, the detecting apparatus 1 includes a screen 11, a detecting unit 13, and a holding unit 14. To be noted, the object to be detected is, for example, an optical film or a light source, such as LED, OLED, CCFL or HCFL. Besides, the object can be a light emitting element, a light source module, or an illumination device. Otherwise, the object to be detected can be an optical film such as a diffusion sheet (plate), a brightness enhancement film (BEF), a prism, or any other optical components. In this embodiment, as shown in FIG. 1, the object to be detected is a LED device O, and the carrier 12 carries the LED device O and has the driving circuit (not shown) for driving the LED device O.

Figure 2:
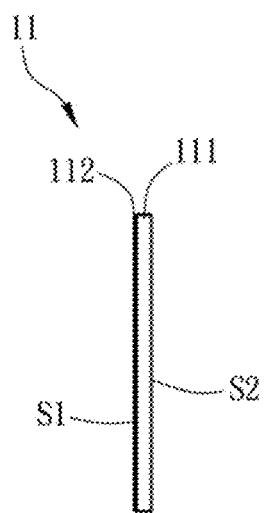
FIG. 2 is a schematic diagram showing a screen of FIG. 1.

Referring to FIGS. 1 and 2, the screen has a first surface S1 and an opposite second surface S2. In this case, the first surface S1 is a surface of the screen 11 facing toward the LED device O, and the LED device O is disposed adjacent to the first surface S1 of the screen 11. The second surface S2 is a surface of the screen 11 facing toward the detecting unit 13. The screen 11 is partially light-permeable, and the material of the screen 11 may include paper, cloth, fiber, plastic, flannel paper, glass, acrylic, or diffusion sheet. In this embodiment, the screen 11 is for example a paper, which is easily obtained and has low cost.

As shown in FIG. 2, the screen 11 includes a screen body and a carbon layer 112 (or a printing layer), and the carbon layer 112 or the printing layer is disposed on the first surface S1 by coating or printing carbon powder or colored powder. Thus, the first surface S1 becomes gray, grayish black, or black, thereby preventing reflective on the first surface S1. For example, when the light source is green, the first surface S1 is printed with red, so that it is possible to prevent the reflective of the green light and thus avoid noise. In this case, the first surface S1 is coated with a black carbon layer 112. When forming the carbon layer 112 or printing layer on the first surface S1, a plurality of recesses (not shown) can be formed on the carbon layer 112 or printing layer for exposing the screen 11 from the bottom of the recesses. In addition, the recesses may be arranged in an array. Moreover, the screen 11 further includes a transparent substrate (not shown), which is closely attached to the second surface S2. The transparent substrate is, for example, a glass for supporting and fixing the screen 11 (e.g. fixing a paper). Since the screen 11 is partial light-permeable, when the LED device O emits light to irradiate the first surface S1 of the screen 11, a part of the light can still penetrate through the screen 11 and present an optical field distribution on the second surface S2. Accordingly, the detecting unit 13 facing toward the second surface S2 of the screen 11 can detect the optical field distribution.

The detecting unit 13 is disposed corresponding to the LED device O, and is disposed adjacent to the second surface S2 of the screen 11. Accordingly, the detecting unit 13 can capture the image of the second surface S2 of the screen 11, thereby calculating the optical field distribution of the LED device O. For example, the detecting unit 13 is a luminance meter, a lux meter, a power meter, a camera, or a spectrometer. In this embodiment, the detecting unit 13 is a camera.

The holding unit 14 is configured to hold the relative distances between the screen 11, the LED device O, and the detecting unit 13. In this embodiment, as shown in FIG. 1, the holding unit 14 includes a moveable frame 141 for keeping the relative distances between the screen 11, the LED device O, and the detecting unit 13, and fixing the relative position of the screen 11 and the detecting unit 13. In other words, the screen 11 and the detecting unit 13 are installed and fixed on the moveable frame 141, so that the distance between the screen 11 and the detecting unit 13 is fixed. Besides, when the moveable frame 141 is moved or rotated, the relative distances between the screen 11, the LED device O and the detecting unit 13 do not change. To be noted, the moveable frame 141 of the invention is not limited to the aspect of FIG. 1, and any aspect of the moveable frame 141 that can maintain the relative distances between the screen 11, the LED device O, and the detecting unit 13 is applicable.

In this embodiment, the detecting apparatus 1 further includes a rotating unit 15 for carrying and rotating the screen 11, the detecting unit 13 and the holding unit 14, or for carrying and rotating the LED device O, so as to change an angle of the LED device O toward the screen 11. Accordingly, the detecting unit 13 can capture the optical field distributions emitted from the LED device O in different angles and directions. In another aspect, the rotating unit 15 may carry and rotate the LED device O or change an angle between the LED device O and an incident light.

In more specific, when the light emitted from the LED device O is projected on the first surface S1 of the screen 11, the detecting unit 13 can capture an image of the second surface S2 of the screen 11. After the rotating unit 15 rotates to another position to change the angle of the LED device O facing toward the screen 11, the detecting unit 13 can capture another image of the second surface S2 of the screen 11. The rotating unit 15 can be a rotating frame or a rotating bracket. In this embodiment, the rotating unit 15 is an annular rotating frame for carrying and rotating the screen 11, the detecting unit 13 and the holding unit 14. The carrier 12 and the LED device O are not rotated and are located at the center of the annular rotating frame.

FIGS. 3A to 3D are top views of the holding unit 14 of the detecting apparatus 1 in different positions. When the rotating unit 15 rotates, the moveable frame 141 at least has a first position P1 and a second position P2 with respect to the LED device O, and the detecting unit 13 captures a first image and a second image of the second surface S2 of the screen 11 as the moveable frame 141 is located at the first position P1 and the second position P2, respectively. Then, the detecting unit 13 calculates the optical field distributions of the LED device O according to the captured first and second images. Herein, the optical field distribution includes the light intensity distribution, color distribution or spectrum distribution.

In this embodiment, the optical field distribution of the LED device O is the intensity distribution of the light emitted by the LED device O. By rotating the rotating unit 15, the detecting unit 13 can capture four images of the second surface S2 while the LED device O is located at the first position P1 (see FIG. 3A), the second position P2 (see FIG. 3B), the third position P3 (see FIG. 3C) and the fourth position P4 (see FIG. 3D), respectively, with respect to the moveable frame 141. Alternatively, it is also possible to manually position the holding unit 14 standing over the LED device O (fifth position, not shown) for capturing an image of the second surface while the LED device O is located at this fifth position. In this case, the detecting unit 13 (e.g. a camera) captures the radiances of the images of the second surface S2 of the screen 11, so as to calculate and obtain the light intensity distributions of the LED device O in different directions. To be noted, the positions shown in FIGS. 3A to 3D are examples only, and of course, the user can rotate the rotating unit 15, so that the detecting unit 13 can capture the radiances of the images of the second surface S2 while the LED device O is located at additional positions with respect to the moveable frame 141.

Figure 4A:
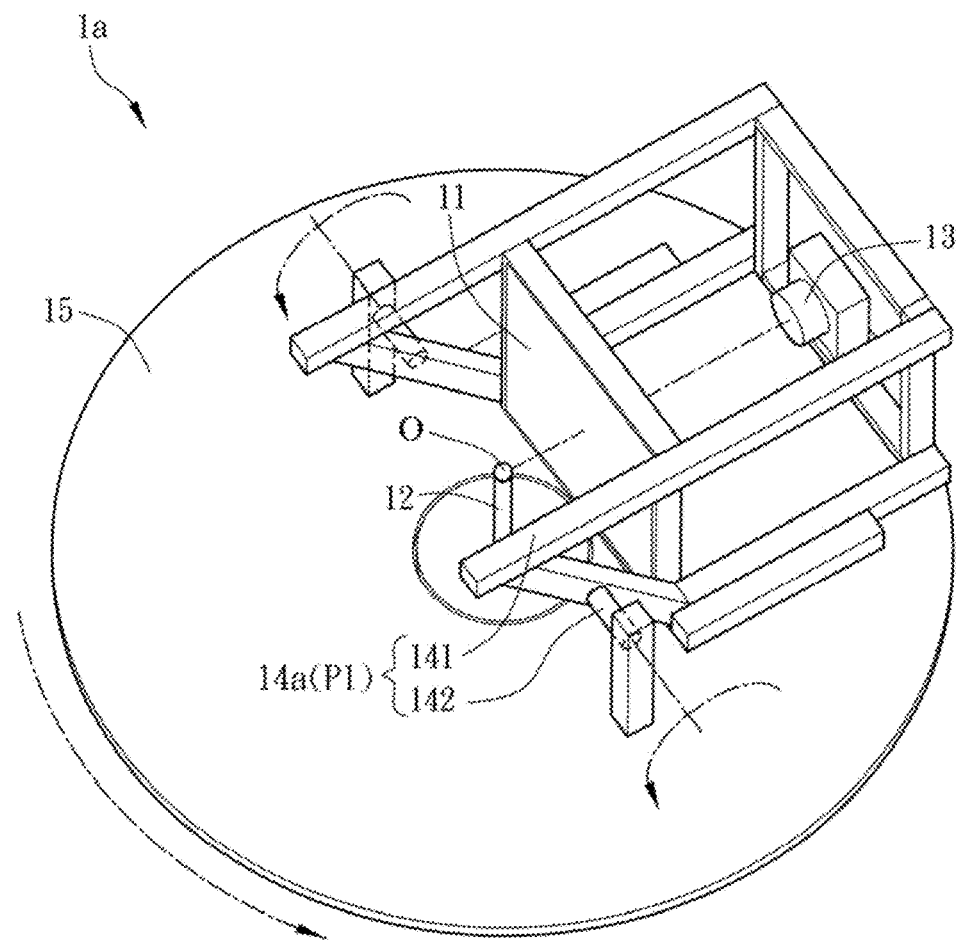
FIGS. 4A and 4B are schematic diagrams showing another aspect of the detecting apparatus.
Figure 4B:
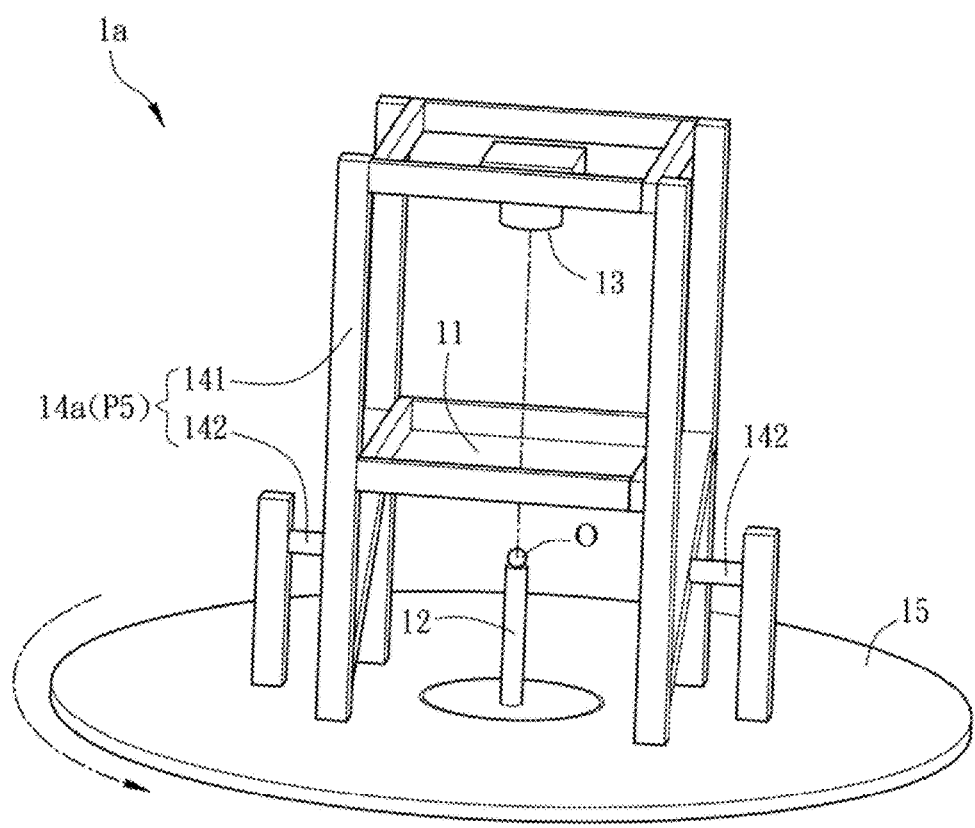

FIGS. 4A and 4B are schematic diagrams showing another aspect of a detecting apparatus 1a.

Similar to the detecting apparatus 1, as shown in FIGS. 3A to 3D, the detecting apparatus 1a is rotated by the rotating unit 15, so that the detecting unit 13 can capture four images of the second surface S2 as the moveable frame 141 is located at the first to fourth positions P1-P4 with respect to the LED device O. In addition, as shown in FIG. 4A, in order to detect at least a half-sphere domain of the optical field distribution of the LED device O, the holding unit 14a further includes a pivot 142 having one end fixed with the rotating unit 15, thereby fixing the relative distance between the holding unit 14a and the LED device O. The moveable frame 141 is rotated about the pivot 142 and has the different positions with respect to the LED device O. FIG. 4A shows the holding unit 14a located at the first position P1. In addition, as shown in FIG. 4B, the moveable frame 141 is rotated about the pivot 142 so as to rotate with respect to the LED device O and stand above it. In this case, the holding unit 14a is located at a fifth position P5. Besides, the holding unit 14a can still keep the relative distances between the screen 11, the LED device O and the detecting unit 13. Herein, two pivots 142 are respectively disposed at two sides of the moveable frame 141 for example. Accordingly; as the rotating unit 15 is rotated, the detecting unit 13 can capture the radiances of four images when the moveable frame 141 is located at the first to fourth positions P1-P4 with respect to the LED device O. Then, the moveable frame 141 can be moved with the pivot 142 to stand above the LED device O, so that the detecting unit 13 can capture the radiance of the image when the moveable frame 141 is located at the fifth position P5 with respect to the LED device O. As a result, the detecting apparatus 1a can use the detecting unit 13 to capture the radiances of at least images of the second surface S2 of the screen 11 as it is located at five positions P1-P5, and then calculate the intensity distribution of at least half-sphere domain of the LED device O. Herein, the radiances of five images in the positions P1-P5 represent the radiances of the light from the LED device O in five different angles. To be noted, to prevent the environmental light from affecting the accuracy of the detecting apparatus 1/1a, the detecting apparatus 1/1a should be placed within a dark environment when using the detecting unit 13 to detect the image of the second surface S2 of the screen 11. Otherwise, it is possible to cover the detecting apparatus 1/1a with an opaque cloth so as to eliminate the interference of the environmental light.

However, because the gray level of the sensor in the camera and the absolute energy of the light are not in a linear relation, the radiance distribution of the second surface S2 of the screen 11 captured by the camera can not present the exact radiance distribution. Therefore, it is necessary to find out the transformation relation between the gray level of the sensor and the energy before capturing the radiance distribution, thereby correctly transforming the captured gray level distribution to obtain the accurate absolute radiance distribution.

In order to find out the transformation relation between the gray level and radiance, a standard light source with known total flux e.g. a white light source) is used to irradiate the first surface S1 of the screen 11, and the detecting unit 13 captures the image of the second surface S2 and records the gray level detected by the sensor of the camera and the energy value of a power meter. Accordingly, the gray level of the light source with known total flux can be obtained, and thus the total flux data corresponding to different gray levels can be calculated. After obtaining these data, it is possible to detect out the accurate optical field energy distribution.

In addition, it is also needed to transform the light intensity distributions of the LED device O in different angles (positions P1-P5) captured by the detecting unit 13 to the same coordinate system. To achieve this, the detecting apparatus 1a further includes a calculating unit (not shown) for performing a light intensity correction and conversion of the image data (radiance distribution data) captured by the detecting unit 13 and performing a coordinate transform to the same coordinate system. Moreover, it is also possible to calculate the total flux of the image data. For example, the calculating unit defines the rectangular coordinate system (Cartesian coordinate system) of every point of the light intensity of the LED device O in different angles captured by the detecting unit 13 in advance, and transfers all captured position coordinates of all angles to the same rectangular coordinate system by coordinate transform, which are then transformed to a spherical coordinate system.

The procedures and calculations for transforming the intensity of the images captured by the detecting unit 13 from the original coordinate system to the spherical coordinate system will be described hereinafter with reference to FIGS. 5A to 5C. In other words, the intensity coordinates of the light from the LED device O in different directions and projected on the second surface S2 of the screen 11 are all transformed to the same spherical coordinate system. To be noted, FIGS. 5A and 5B only show the LED device O, the screen 21 and the detecting unit 23, and the origin of the coordinate system represents the center of the LED device O.

As shown in FIGS. 5A and 5B, the coordinate transform equation for transforming the coordinates captured in different angles to the same rectangular coordinate system is as follow:

$$\begin{bmatrix} x \\ y \\ z \end{bmatrix} = \begin{bmatrix} \cos\Phi_x & 0 & -\sin\Phi_x \\ -\sin\Phi_x\sin\Phi_y & \cos\Phi_y & -\cos\Phi_x\sin\Phi_y \\ \sin\Phi_x\cos\Phi_y & \sin\Phi_y & \cos\Phi_x\cos\Phi_y \end{bmatrix} \begin{bmatrix} x' \\ y' \\ z' \end{bmatrix}$$

Wherein, (x, y, z) represents the coordinate system used in the lab, and (x', y', z') represents the coordinate system of the images captured by the detecting unit 13. The screen 11 and detecting unit 13 of FIG. 5A are rotated about the X-axis in counterclockwise for an angle $\Phi_y$ (from the screen 11 of dotted lines to that of solid lines). In addition, the screen 11 and detecting unit 13 of FIG. 5B are rotated about the Y-axis in clockwise for an angle $\Phi_x$ (from the screen 11 of dotted lines to that of solid lines).

In addition, the calculating unit further transforms all new coordinates of the images in different positions P1-P5 to the spherical coordinate system (polar coordinate system), thereby establishing the intensity distribution of at least half-sphere domain. Accordingly, the optical field intensity distribution of the LED device O can be obtained. The relationship between the spherical coordinate system and the rectangular coordinate system is shown as the following equation:

$$r = \sqrt{x^2 + y^2 + z^2}, \theta = \cos^{-1}\left(\frac{y}{r}\right), \phi = \tan^{-1}\left(\frac{x}{z}\right)$$

Wherein, as shown in FIG. 5C, θ and Φ represent the coordinates of spherical coordinate system, and x, y and z represent the above-mentioned transformed new coordinates.

Besides, in order to get the correct value of the light intensity, it is necessary to perform the proper modification and conversion to the light intensity, in this invention, after the detecting unit 13 (camera) captures the radiance distribution of the second surface S2 of the screen 11, the irradiance ($E_{screen}$) of the first surface S1 of the screen 11 can be calculated according to the following equation:

$$E_{screen} = \frac{B_{screen}}{C_{screen\_vignetting}(\theta_2) \cdot I_{screen}(\theta_1, \theta_S = 0)}$$

Wherein, the irradiance of the light is converted to the intensity of the light based on the cosine third law. Referring to FIG. 5D, the conversion equation between the light intensity ($I_{source}$) of the scattered light and the irradiance ($E_{screen}$) irradiating on the screen 11 by the light is shown as follow:

$$E_{screen}(\theta_2) = \cos^3\theta_1 \cdot I_{source}$$

Wherein, $\theta_1$ is an included angle between the scattered light (for BSDF measurement case) and the normal of the screen 11 or an angle between the emitting light (for light source measurement case) and the normal of the screen 11. And $\theta_2$ is an included angle between the lens axis of the detecting unit 13 and the chief ray from one point of the screen 11.

When using a camera as the detecting unit 13 to capture the image of the screen 11, the captured radiance distribution may be affected by the scattering property of the screen 11, the geometric angle for capturing the image, the vignette or dark corner effect of the lens of the detecting unit 13. Thus, it is needed to perform proper correction to the image data captured by the detecting unit 13. In general, the radiance distribution is obtained by using the light with uniform irradiance on the first surface S1 (solar light at noon) to directly irradiate the screen 11 and then capturing with the luminance meter. The calibration parameters for the screen scatter property, geometric angle of image capturing, and lens vignette can be retrieved from the radiance distribution, so as to calibrate the image data captured by the luminance meter. According to the above two equations of $E_{screen}$, the relationship between the light intensity and the lux of the sensor of the detecting unit 13 can be obtained as the following equation:

$$I_{source} = \frac{B_{screen}}{\cos^3\theta_1 \cdot C_{screen\_vignetting}(\theta_2) \cdot I_{screen}(\theta_1, \theta_S = 0)}$$

Wherein, $C_{screen\_vignetting}(\theta_2)$ is the distribution of the sensor by using the uniform radiance light structure, and $I_{screen}(\theta_2, \theta_s=0)$ is the light intensity of the scattered light in different incident angles at the normal position of the screen 11.

To be noted, if the screen 11 matches the Lambertian property, the calibration of the detecting unit 13 can be omitted, so that the above equation can be simplified as:

$$I_{source} = \frac{E_{CCD}}{\cos^3\theta_1 \cos^4\theta_2}$$

Herein, $\theta_2$ represents the included angle between the lens axis of the detecting unit 13 and the scattered light from one point of the screen 11.

Accordingly, after capturing the radiance distributions on the second surface S2 of the screen 11 causing by illuminating by the LED device O in different, angles and performing the intensity correction and coordinate transform of the light, the calculating unit integrates the intensity distributions in different angles.

Figure 6A:
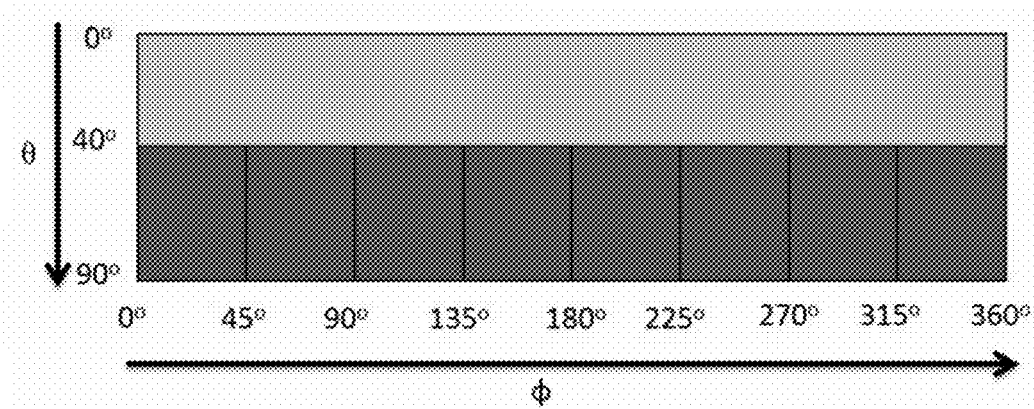
FIG. 6A is a schematic diagram showing the $\theta$ and $\Phi$ planes expanded from the sphere coordinate.

After the coordinate transform, the spherical coordinate system is developed into θ and Φ planes as shown in FIG. 6A. Herein, Y axis is the value of the included angle θ, and X axis is the included angle Φ. To be noted, the ranges of the included angles θ and Φ of the images are for examples only, and it is unnecessary to cut each image at the positions θ and Φ according to this distribution.

Referring to FIG. 6A, the angle θ for capturing the light intensity distribution from the top of the LED device O ranges from 0 to 40 degrees, and the angle Φ ranges between 0 to 360 degrees. Besides, in the light intensity distribution as the angle θ is larger than 40 to 90 degrees in the Y axis direction, only a part of the angle Φ can be detected in each detection. Thus, it is needed to capture multiple times for gathering the complete distribution. After calculating and gathering all spherical coordinates of the light intensity distributions, the captured distributions in different angles can be corresponding to the spherical coordinates. Finally, all data are integrated to obtain the light intensity distribution of at least half-sphere domain.

However, the distributions of the θ and Φ planes developed from, the spherical coordinates are not directly perceived. Thus, the present invention further transforms the light intensity distribution to another more directly perceivable coordinate system (see FIG. 6B) after integrating the data.

Figure 6B:
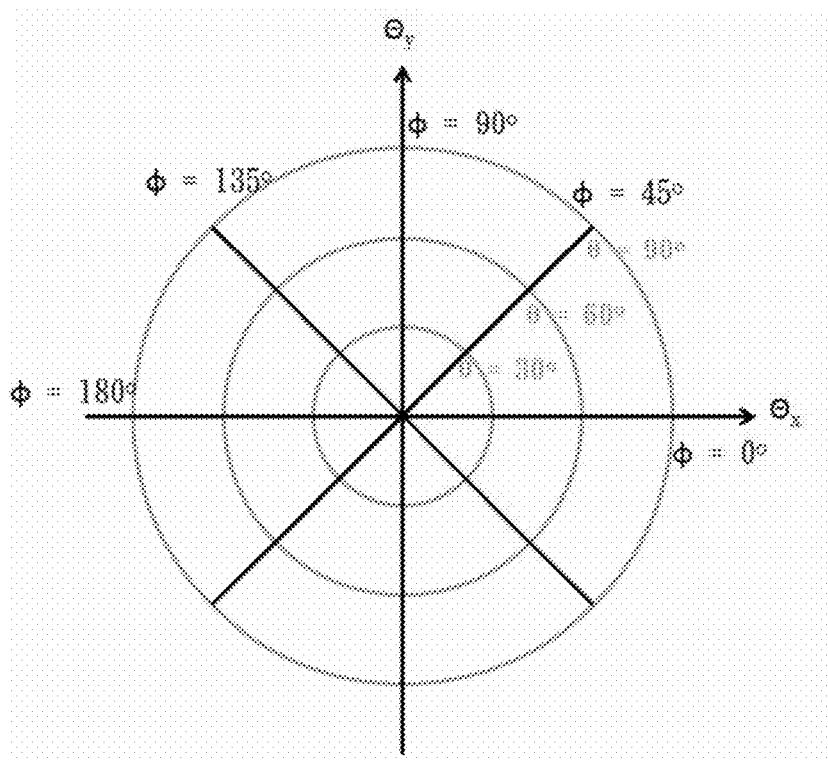
FIG. 6B is a schematic diagram showing the light intensity distribution in sphere coordinate.

In FIG. 6B, the distance between one point and the origin represents the angle θ, and the included angle with respect to the axis X is Φ. The one-dimensional light intensity distribution of the light source can be represented by the distribution as regarding to any angle Φ (the angle θ is from 0 to 90 degrees).

The detection results of the LED device O detected by the detecting apparatus 1a of the invention will be described hereinafter with reference to FIGS. 7A to 7F.

Figure 7A:
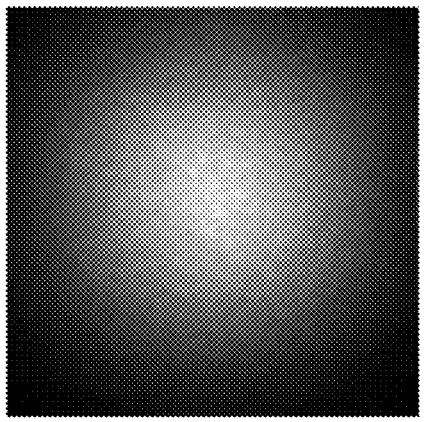
FIGS. 7A to 7H are schematic diagrams showing the detection results of a LED device detected by the detecting apparatus of the invention.
Figure 7B:
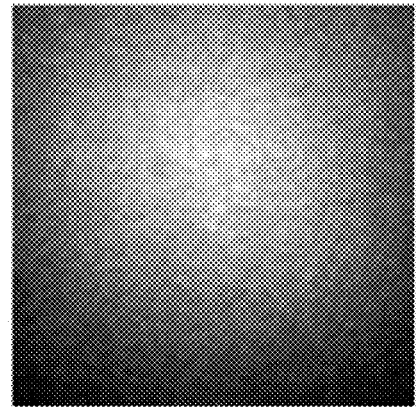

FIGS. 7A and 7B show the light intensity distributions captured by the detecting unit 13 from the top of the LED device O (the position P5 of FIG. 4B). Herein, FIG. 7A shows the radiance distribution captured by the rotating unit 15 before calibration, and FIG. 7B shows the light intensity distribution after calibration and conversion.

Figure 7C:
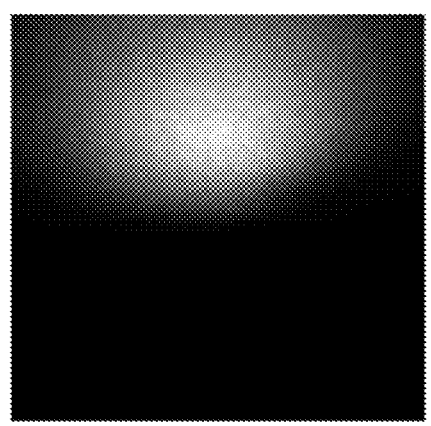
Figure 7D:
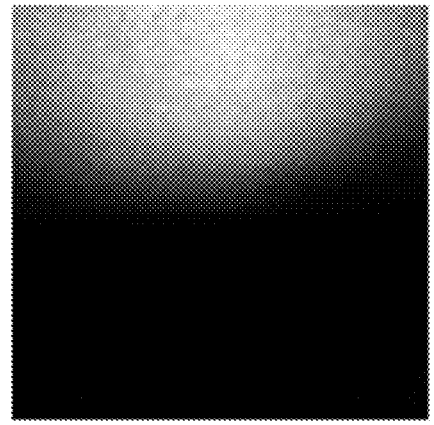

FIGS. 7C and 7D show the light intensity distributions captured by the detecting unit 13 from lateral side (horizontal direction) of the LED device O (the position P1 of FIG. 4A). Herein, FIG. 7C shows radiance distribution captured by the rotating unit 15 before vignette correction, and FIG. 7D shows the light intensity distribution after calibration and conversion.

Figure 7E:
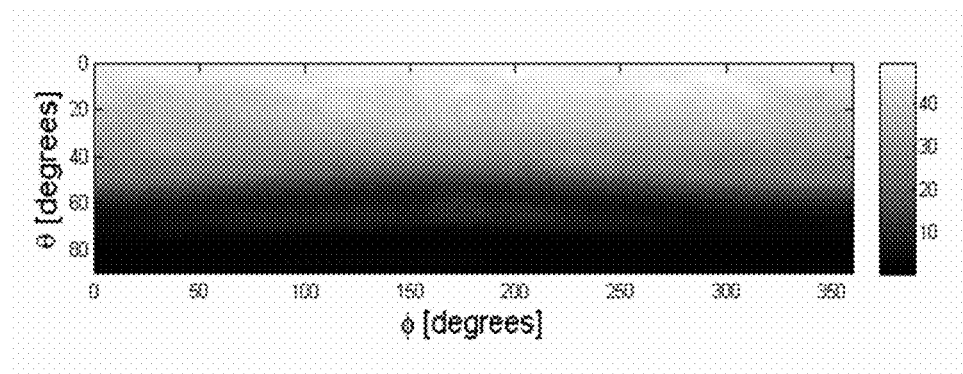
Figure 7F:
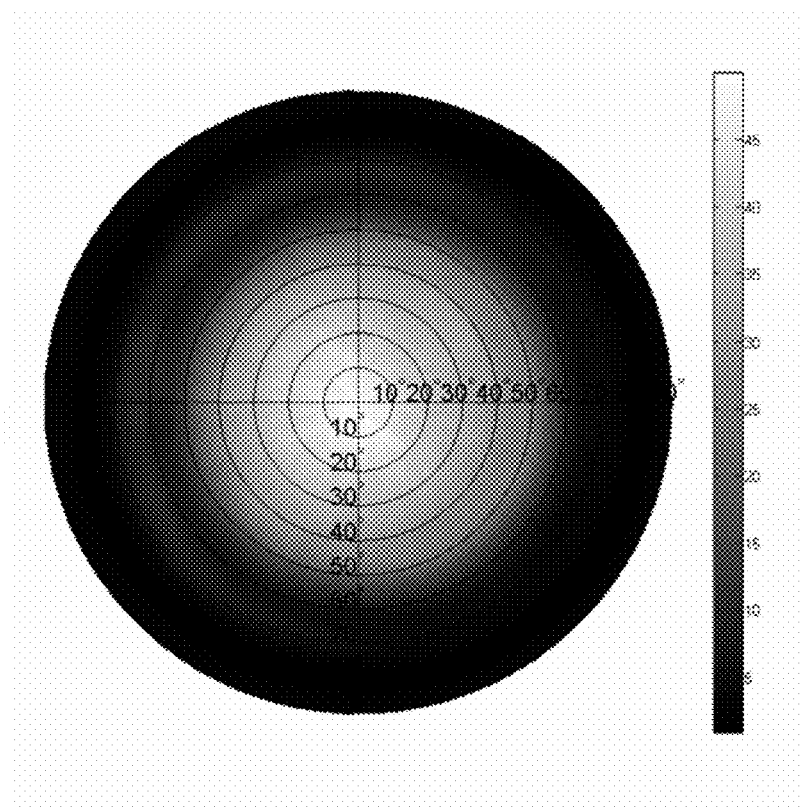

FIG. 7E shows the light intensity distribution of the LED device O (Cree XR-E LED) developed in θ and Φ planes from the spherical coordinates, and FIG. 7F shows the transformed light intensity distribution of more directly perceived coordinate system.

Figure 7G:
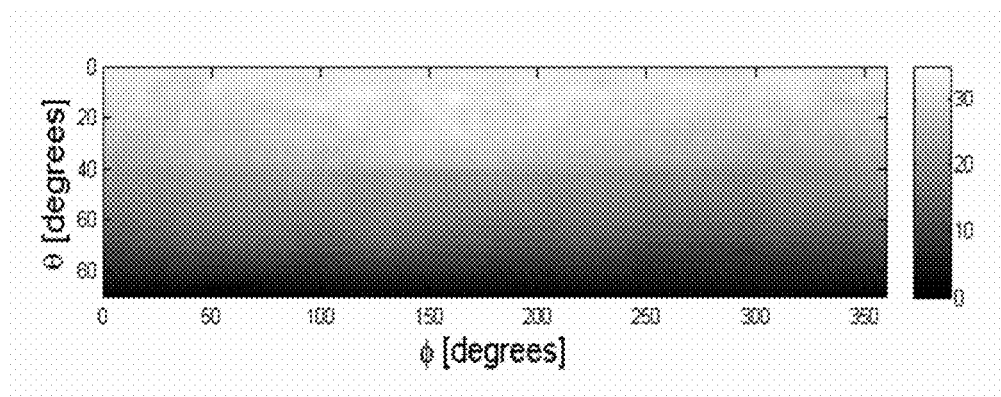
Figure 7H:
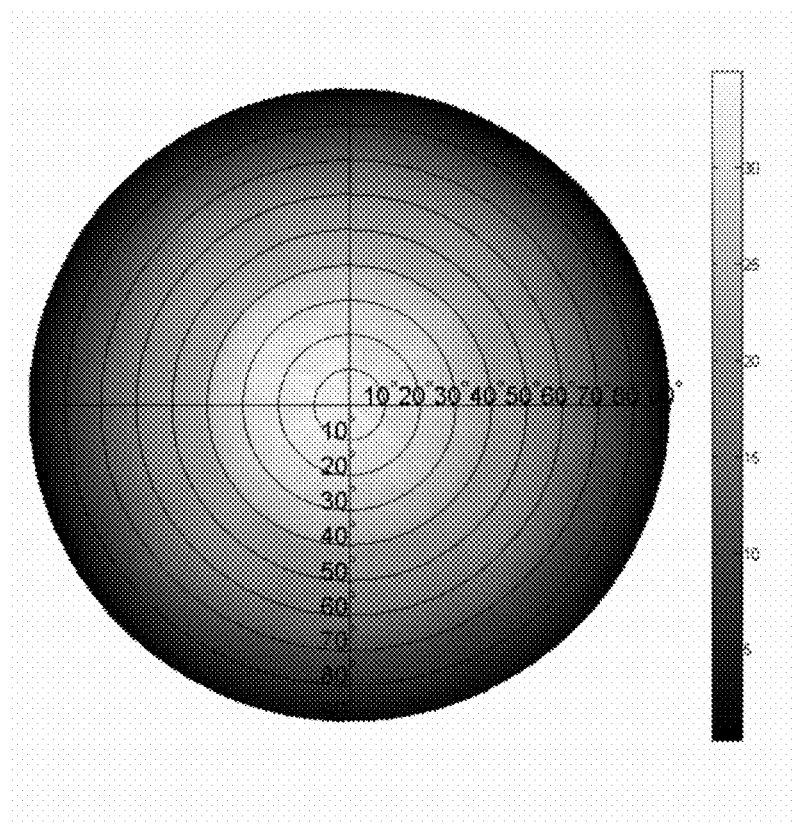

FIG. 7G shows the light intensity distribution of the LED device O (Cree XP-G LED) developed in θ and Φ planes from the spherical coordinates, and FIG. 7H shows the transformed light intensity distribution of more directly perceived coordinate system.

Compared with the detection result detected by the conventional art, which detects the one-dimensional light intensity distribution by fixing the relative distance between the power meter and the LED (XR-E) and rotating the LED, the detection result of the invention is more than 99% similar to the conventional detection result. This comparison proves that the detecting apparatus of the invention can not only detect the light intensity distribution (optical field distribution) of the light source rapidly, but also have the advantages of low cost and high accuracy. In this embodiment, a proper treatment can be applied in advance to the surface of other components except for the LED device O so as to decrease the detection noises. The proper treatment is to make the surface of the component to equip with the light absorbing property with respect to the LED device O. For example, when detecting the optical field distribution of the LED device O, it is possible to black the surface of the components of the detecting apparatus for decreasing the noise during detection.

Figure 8A:
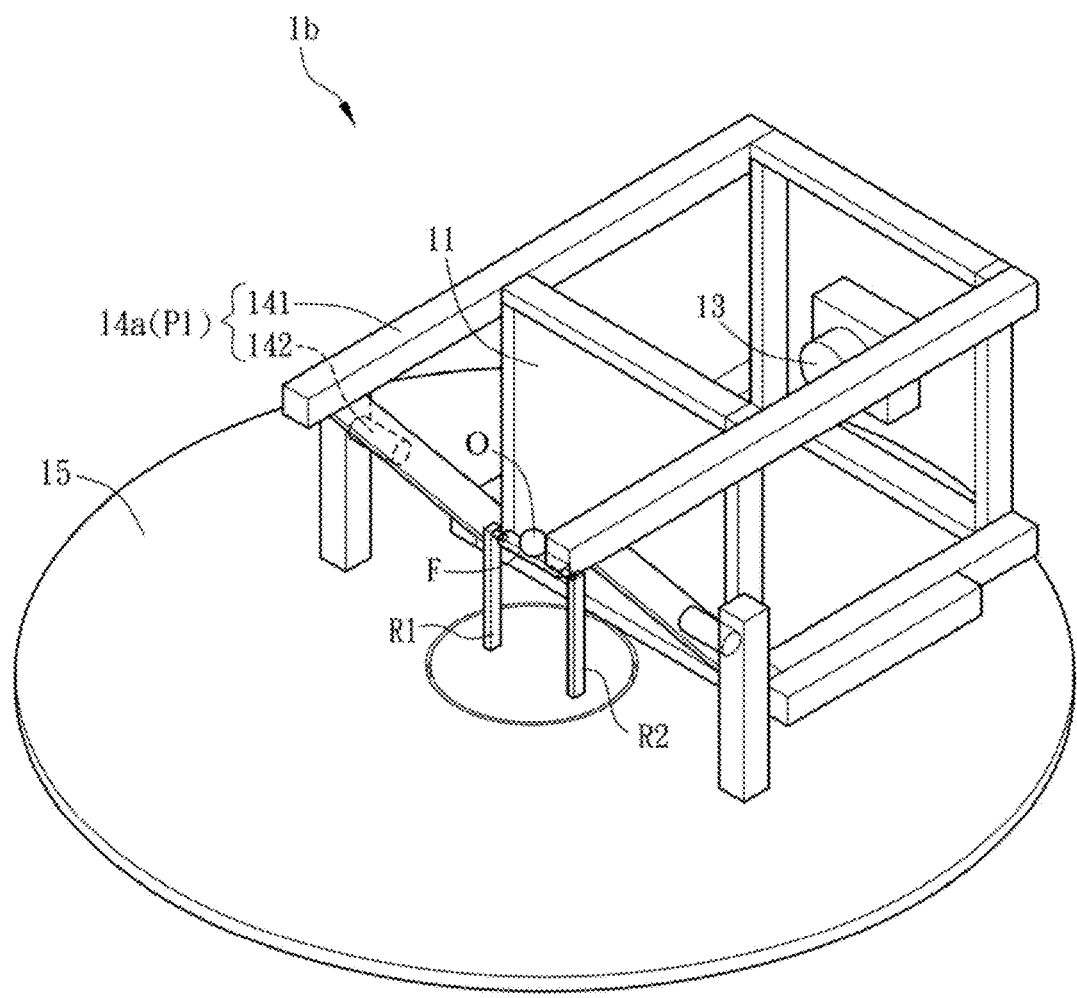
FIGS. 8A to 8D are schematic diagrams showing the detecting apparatuses of different aspects.
Figure 8B:
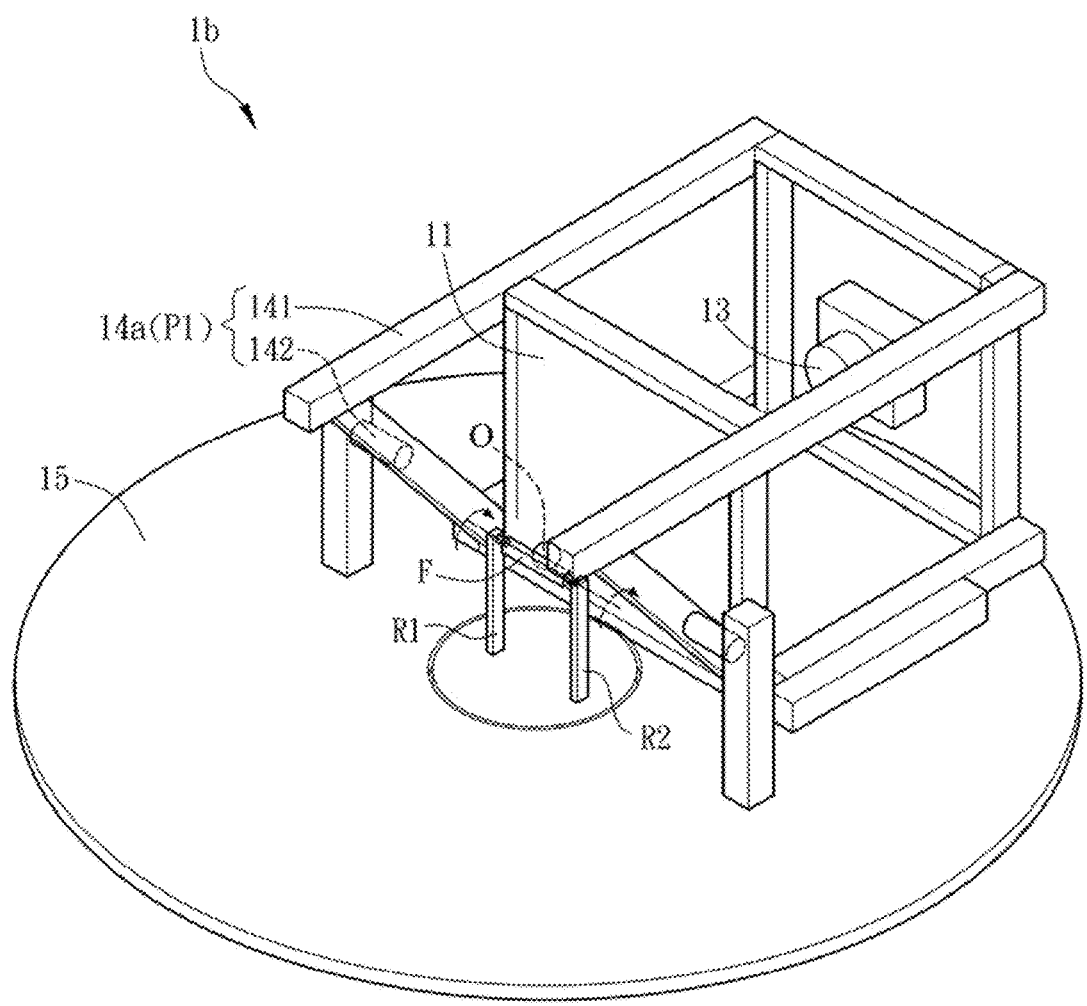

FIGS. 8A to 8B are schematic diagrams showing a detecting apparatus 1b of another aspect.

Similar to the detecting apparatus 1a, the detecting apparatus 1b also uses the detecting unit 13 to capture the radiances of five images of the second surface S2 of the screen 11 in at least five positions P1-P5, thereby obtaining the light intensity distribution of the LED device O in at least half-sphere domain.

The difference there between is that, in order to use the detecting apparatus 1b of FIG. 8A to obtain the light intensity distribution of the LED device O in half-sphere domain, the LED device O is disposed on a rotating frame F. The rotating frame F is pivoted to and supported by two brackets R1 and R2 (a single bracket is also applicable), and the brackets R1 and R2 are held steady. In this case, the LED device O can be rotated by the rotating frame F and the brackets R1 and R2, and the rotating frame F and the brackets R1 and R2 are designed to not block the light source. Besides, a latch (not shown) is used to fix the light source in a certain angle. As shown in FIG. 8B, when the rotating frame F is rotated to an angle, the LED device O is accordingly rotated for an angle (e.g. 90 degrees). After repeatedly capturing the radiances of five ages of the second surface S2 of the screen 11 in at least five positions P1-P5, the detecting unit 13 can detect the images of the surface S2 of the screen 11 generated by the light emitted from the other half sphere of the LED device O, thereby obtaining the light intensity distribution of the other half-sphere domain. By integrating the light intensity distributions of the LED device O of two half-sphere domains, the light intensity distribution of the LED device O of the entire sphere domain is established.

Figure 8C:
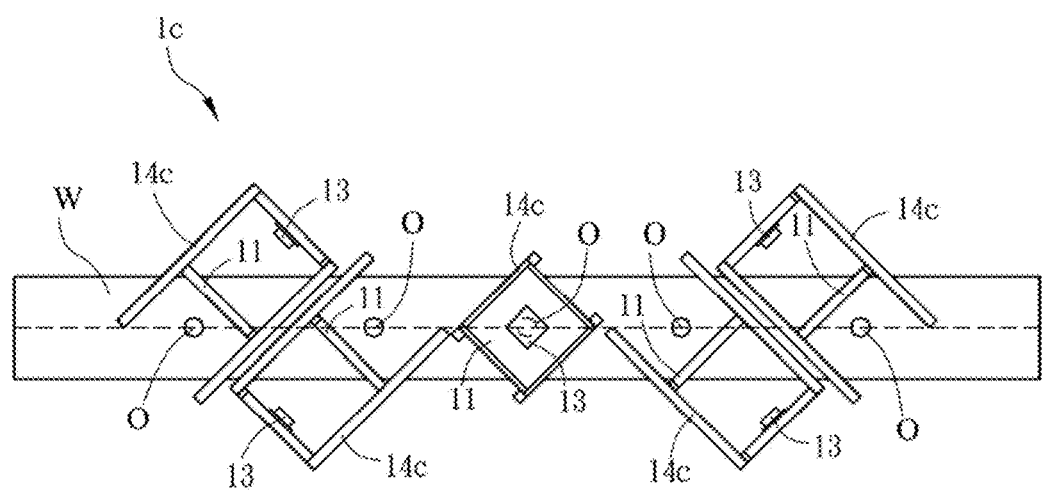

FIG. 8C is a schematic diagram showing a detecting apparatus 1c of another aspect.

Different from the detecting apparatus 1 of the previous embodiment, the detecting apparatus 1c includes a plurality of holding units 14, and the holding unit 14 of the detecting apparatus 1b can be directly applied to the production line of the LED device O. For example, five moveable frames 14c of different angles are configured at the conveyer W of the production line of the LED device O in sequence, and the screen 11 and detecting unit 13 are disposed thereon respectively. Accordingly, the LED device O can be transferred on the conveyer W and stopped at different positions for detecting the light intensity distributions of the LED device O in different angles, thereby obtaining the light intensity distribution of the LED device O of at least half-sphere domain.

Figure 8D:
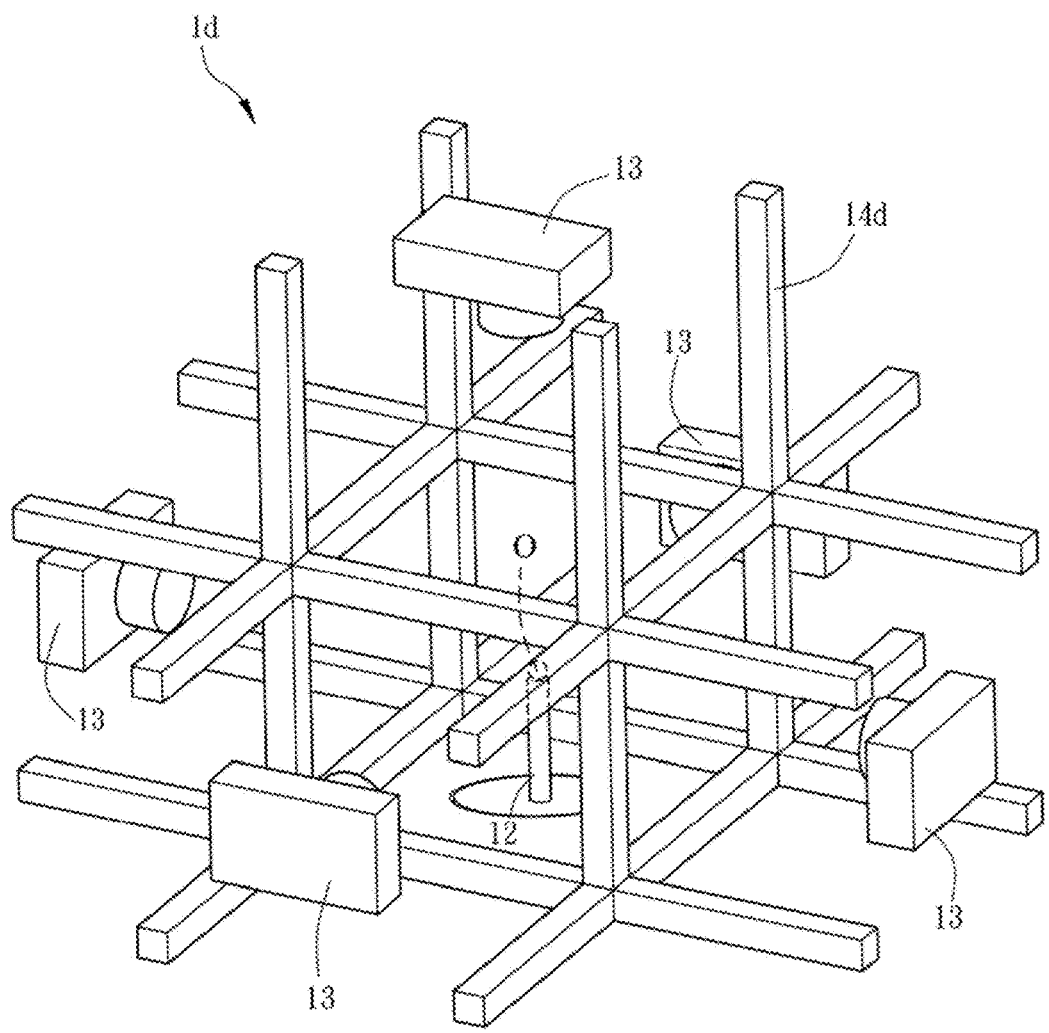

FIG. 8D is a schematic diagram showing a detecting apparatus 1d of another aspect. To be noted, in order to clearly show the relative positions of the detecting unit 13 and the LED device O, the other components including the screen 11 and the bracket for fixing the detecting unit 13 are not shown in FIG. 8D.

Different from the detecting apparatus 1, the detecting apparatus 1d includes multiple screens (not shown), detecting units 13 and holding units 14, and the detecting units 13 simultaneously capture images of the second surfaces of the screens. For example, as shown in FIG. 8D, there are five screens (not shown), five detecting units 13, and five holding units 14d. Accordingly, five detecting units 13 can be configured on five different positions with respect to the LED device O for simultaneously or separately capturing the optical field distributions of the LED device O in different angles, thereby obtaining the optical field distributions of the LED device O of at least half-sphere domain.

Figure 9A:
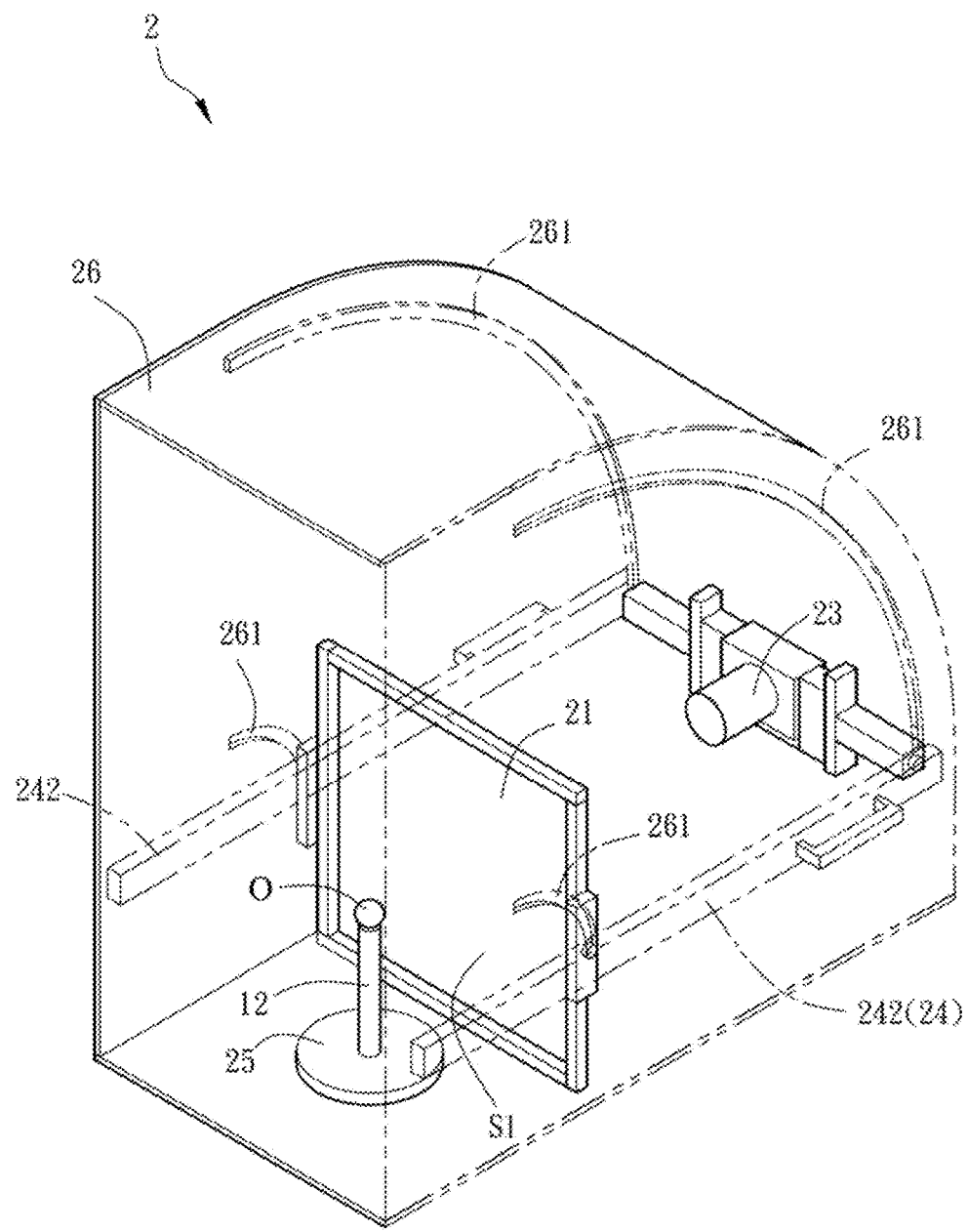
FIGS. 9A and 9B are schematic diagrams detecting apparatus according to a second embodiment of the invention.
Figure 9B:
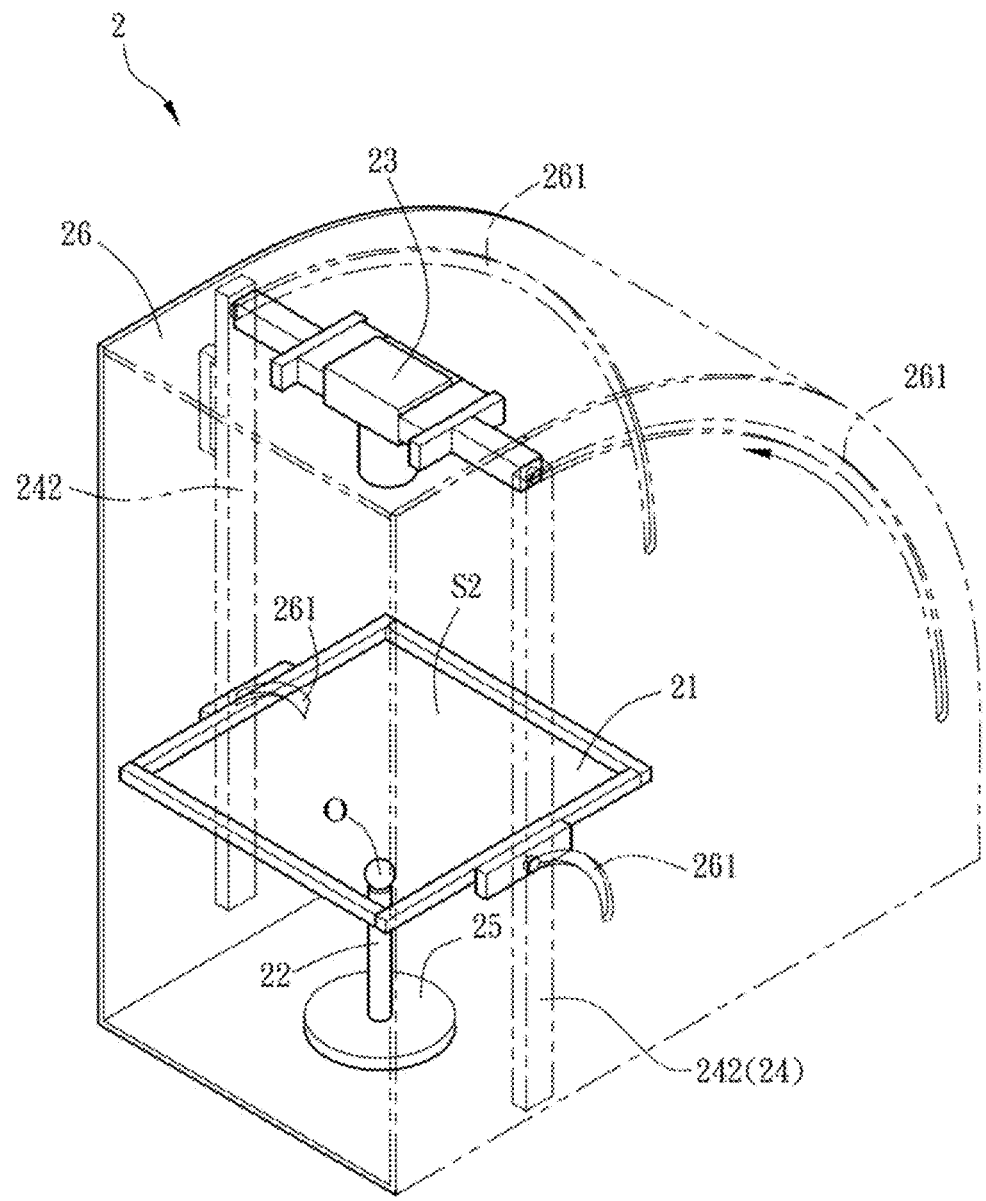

FIGS. 9A and 9B are schematic diagrams of a detecting apparatus 2 according to a second embodiment of the invention.

Different from the detecting apparatus 1a of the first embodiment, the holding unit 24 of the second embodiment includes a rotating bracket 242, and the screen 21 and the detecting unit 23 are fastened on the rotating bracket 242 for fixing the relative distance between the screen 21 and the detecting unit 23. By rotating the rotating bracket 242, the screen 21 and the detecting unit 23 can be moved with relative to the unmoved LED device O, so that the detecting unit 23 can capture different images of the second surface S2 of the screen 21 at different positions P1 and P5 as shown in FIGS. 3A to 3D.

In addition, the detecting apparatus 2 may further include a shell 26, which has a sector-like shape. The rotating bracket 242 is pivotally disposed on the shell 26, and the screen 21, the rotating bracket 242, the detecting unit 23 and the LED device O are all positioned inside the shell 26. The shell 26 can provide a totally dark detecting environment for the detecting apparatus 2 so as to prevent the interference of detection accurate by the environmental light. Besides, the shell 26 has at least one track 261, and the rotating bracket 242 is moved along the track 261. In this case, the shell 26 has, for example, four arc tracks 261, which are respectively used for guiding the rotating bracket 242, the screen 21 and the detecting unit 23 to rotate. As shown in FIGS. 9A and 9B, the rotating bracket 242 can be rotated along the track 261 of the shell 26 so as to change the relative positions between the screen 21, the detecting unit 23 and the LED device O, so that the detecting unit 23 can capture the images of the second surface S2 of the screen 21 as the LED device O is in different tilting angles.

Besides, the detecting apparatus 2 further includes a rotating unit 25, which carries and rotates the LED device O, so that the detecting unit 23 can detect the optical field distributions as the LED device O is positioned at different horizontal angles. The technical features of other components of the detecting apparatus 2 can be referred to the descriptions of the detecting apparatus 1a, so the illustrations thereof are not repeated.

Figure 10:
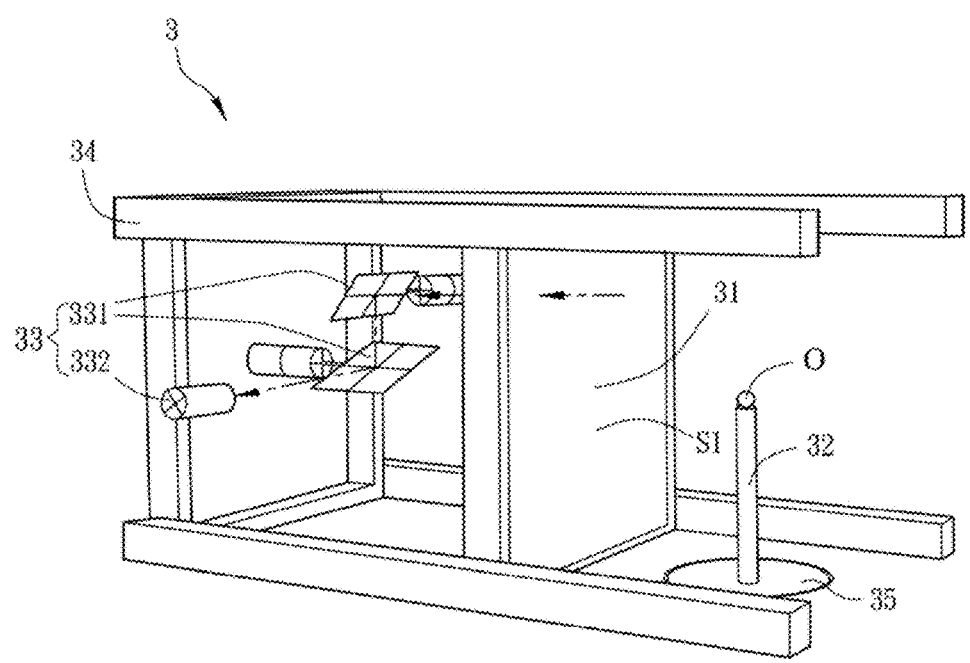
FIG. 10 is a schematic diagram of a detecting apparatus according to a third embodiment of the invention.

FIG. 10 is a schematic diagram of a detecting apparatus 3 according to a third embodiment of the invention.

Different from the detecting apparatus 1a of the first embodiment, the detecting unit 33 of the detecting apparatus 3 further includes a galvo mirror assembly 331 and a detecting device 332. The galvo mirror assembly 331 scans the image of every point of the second surface S2 of the screen 31 in sequence. In this case, the galvo mirror assembly 331 includes two optical galvo mirrors, and the detecting device 332 is a spectrometer for example. The two optical galvo mirrors are rotated relatively so as to scan the images of the second surface (not shown) of the screen 31 with different coordinates in sequence. In addition, the LED device O emits light to the screen 31, and the spectrometer receives the intensity of the light projected on different coordinates of the second surface. Moreover, since the LED device O is disposed on a rotating unit 35, it is possible to detect the light intensity distribution of at least half-sphere domain of the LED device O, and to obtain the spectrum distribution of each point of the light intensity distribution.

Figure 11:
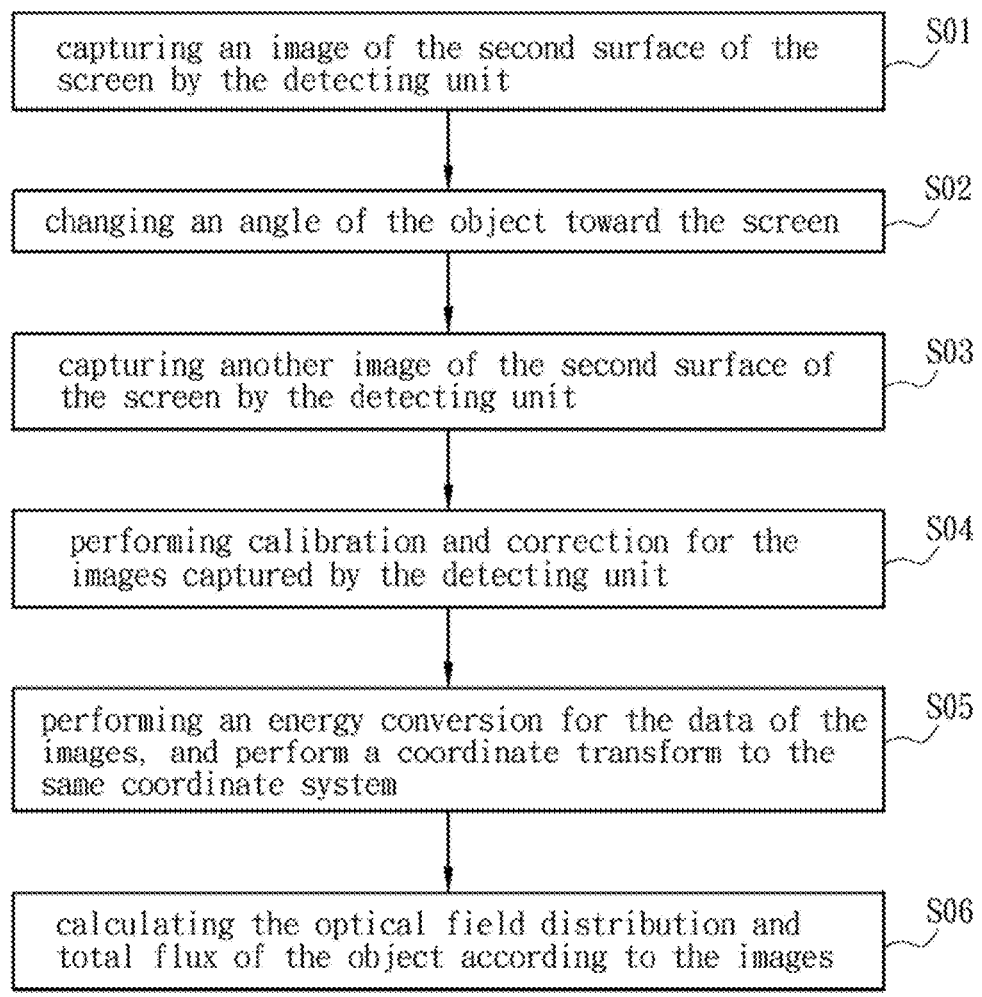
FIG. 11 is a flow chart of a method for detecting optical field distribution of the invention.

FIG. 11 is a flow chart of a method for detecting the optical field distribution of an object according to the invention.

A method for detecting an optical field distribution of an object is applied to a detecting apparatus, such as the above-mentioned detecting apparatus 1a.

The method for detecting an optical field distribution of an object of the invention includes the following steps S01 to S03.

In the step S01, as shown in FIG. 4A, an image of the second surface S2 of the screen 11 is captured by the detecting unit 13.

In the step S02, as shown in FIGS. 4A and 4B, an angle of the object toward the screen 11 is changed. Herein, the angle of the LED device O toward the screen 11 is changed by rotating the rotating unit 15 and the pivot 142. Referring to FIGS. 9A and 9B, the rotating unit 25 carries and rotates the LED device O. Otherwise, as shown in FIGS. 4A and 4B, the rotating unit 15 carries and rotates the screen 11, the detecting unit 13 and the moveable frame 141.

In the step S03, another image of the second surface S2 of the screen 11 is captured by the detecting unit 13. Herein, after the step S02 of changing the angle of the object toward the screen 11, the detecting unit 13 captures the radiances of the images of the second surface S2 of the screen 11 in at least five positions, and then the optical field distribution of the LED device O of at least half-sphere domain is calculated. In addition, when multiple screens 11 and detecting units 13 are configured, the detecting units 13 can simultaneously or separately capture multiple images of the second surface S2 of the screen 11.

Furthermore, the method for detecting an optical field distribution of an object of the invention may further include steps S04 and S05. The step S04 is to perform calibration and correction for the images captured by the detecting unit 13. Since the captured radiance distributions may be affected by the material uniformity of the screen 11, the geometric angle for capturing images, the vignette or dark corner effect of the lens of the detecting unit 13, the image data captured by the detecting unit 13 must be corrected. In general, the radiance distribution is obtained by using the light with uniform irradiance (solar light at noon) to directly irradiate the screen 11 and then capturing with the luminance meter. The calibration parameters for the screen scatter property, geometric angle of image capturing, and lens vignette can be retrieved from the radiance distribution, so as to calibrate the image data captured by the radiance meter. If the screen 11 and the detecting unit 13 are not changed, it is unnecessary to perform the step S04 (calibration and correction) for every detection.

The step S05 is to perform an energy conversion for the data of the images, and perform a coordinate transform to the same coordinate system. In this case, the data of at least five images of the second surface S2 at five positions are transformed to the same spherical coordinate system.

Moreover, the method for detecting an optical field distribution of an object of the invention may further include a step S06. The step S06 is to calculate the optical field distribution and total flux of the object according to the images. In this case, a calculating unit is configured to calculate the optical field distribution of the LED device O according to the at least five images, and then calculate the total flux. The optical field distribution includes the light intensity distribution, color distribution or spectrum distribution.

In order to more precisely detect the optical field distribution, the detecting method of the invention further includes a step of measuring a standard light source with a known total flux so as to obtain the transform relation between the image gray level and the absolute energy.

The other technical features of the detecting method of the invention can be referred to the above embodiments, so the detailed description thereof is omitted.

As mentioned above, the detecting apparatus and detecting method of the invention can replace the commercialized photometer, and have the advantages of fast and convenient detection and lower cost. Besides, regarding to the application, the detecting apparatus and detecting method of the invention can further use the calculating unit to obtain the total flux by integrating the light intensity distribution with the solid angle after capturing the light intensity distribution of the sphere domain of the light source. Thus, the invention can further replace the conventional method for detecting the total flux of the light source by the integrating sphere.

Figure 12A:
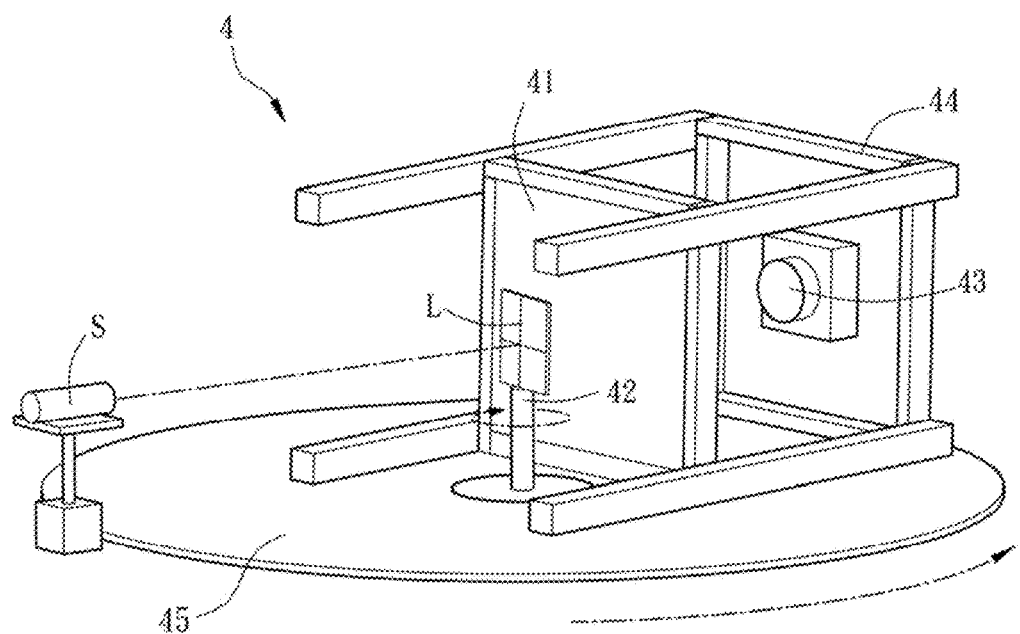
FIGS. 12A and 12B are schematic diagrams of a detecting apparatus according another embodiment of the invention.
Figure 12B:
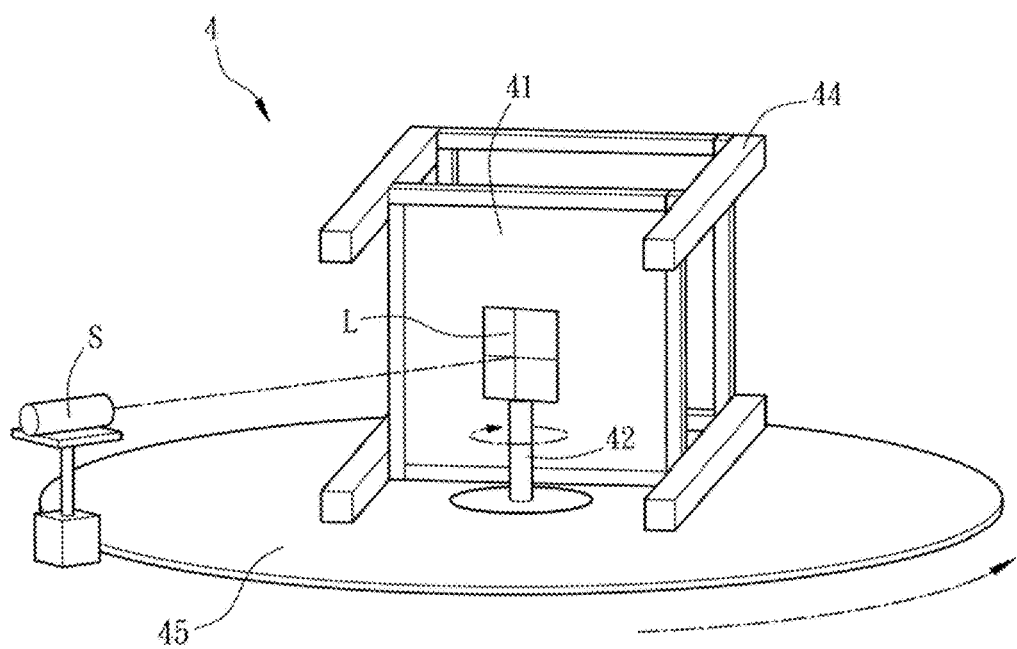

After some proper modifications, the detecting apparatus of the invention can be further used to detect the bidirectional scattering distribution function (BSDF) of an optical film. FIGS. 12A and 12B are schematic diagrams of a detecting apparatus 4 according another embodiment of the invention. In this embodiment, the object to be detected is an optical film such as a diffusion sheet L. The diffusion sheet L is fixed on the carrier 42, and then a stable light source S (e.g. laser) emits light to irradiate the diffusion sheet L. The diffusion sheet L is rotated to change the incident angle of the light. After rotating the diffusion sheet L a round with respect to the detecting apparatus, the light intensity distribution of the light outputting side of the diffusion sheet L in at least half-sphere domain can be obtained. Then, the desired BSDF of the diffusion sheet L can be calculated. To be noted, different from the screen 11 of the detecting apparatus 1a, the screen 41 of the detecting apparatus 4 must be configured with a through hole, which allows the light from the stable light source S to pass through the screen 41 and reach the diffusion sheet L, while detecting the reflective light distribution. In addition, the holding unit 44 also needs a proper through hole for allowing the light from the light source S to pass through the holding unit 44 and reach the diffusion sheet L. Besides, in the case of using the detecting apparatus 2 of the second embodiment of FIG. 9A to detect the BSDF of the diffusion sheet L, when the detecting apparatus 2 is rotated, the shell 26 must be configured with a channel for the light to pass through. In other words, the shell 26 also needs a through hole, so that the light from the light source can pass through the shell 26 and reach the diffusion sheet L.

In summary, the detecting apparatus and method of the invention detects an object disposed adjacent to the first surface of the screen, and the detecting unit is disposed corresponding to the object and located adjacent to the second surface, of the screen. Besides, the holding unit holds the relative distances between the screen, the object and the detecting unit, and the detecting unit captures the image of the second surface of the screen for calculating the optical field distribution of the object. Accordingly, the detecting unit can capture the optical field distributions of the light emitted by the object from different angles or directions, thereby obtaining the optical field distributions of the object in at least half-sphere domain. Therefore, the detecting apparatus and method of the invention can replace the commercialized photometer and integrating sphere, and have the advantages of fast and convenient detection and lower cost.

Moreover, regarding to the application, the detecting apparatus of the invention can further replace the conventional method for detecting the total flux of the light source by the integrating sphere. After some proper modifications, the detecting apparatus of the invention can further the BSDF of an optical film.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A detecting apparatus for detecting an object, comprising:
    multiple screens, each of the screens is non-electroluminescent and at least partial light-permeable and has a first surface and a second surface opposite to each other, wherein the object is disposed on a side of the first surface of each screen;
    multiple detecting units, each of the detecting units is disposed corresponding to the object and located on a side of the second surface of each screen; and
    multiple holding units, wherein the object is a light source or an optical film, and when a light emitted from the object passes through each screen to reach each detecting unit, the detecting units capture images of the second surfaces of the screens so as to calculate optical field distributions of the object while the multiple holding units hold fixed relative distances between each screen, the object and each detecting unit.

2. The detecting apparatus of claim 1, wherein the material of the screens comprise paper, cloth, fiber, plastic, flannel paper, glass, acrylic, or diffusion sheet.

3. The detecting apparatus of claim 1, wherein each of the screens comprises a screen body and a carbon layer or a printing layer, and the carbon layer or the printing layer is disposed on the first surface.

4. The detecting apparatus of claim 3, wherein the carbon layer or the printing layer comprises a plurality of recesses for exposing the screen body.

5. The detecting apparatus of claim 1, wherein each of the screens further comprises a transparent substrate closely attached to the second surface.

6. The detecting apparatus of claim 1, wherein each of the detecting units comprises a luminance meter, a lux meter, a power meter, a camera, or a spectrometer.

7. The detecting apparatus of claim 1, wherein each of the detecting units further comprises a Galvo mirror assembly for scanning the image of the second surface of the screen.

8. The detecting apparatus of claim 1, wherein each of the optical field distributions comprises a light intensity distribution, a color distribution, or a spectrum distribution.

9. The detecting apparatus of claim 1, wherein each of the holding units comprises a moveable frame having a plurality of positions with respect to the object.

10. The detecting apparatus of claim 9, wherein each of the detecting units captures a plurality of images of the second surface of each of the screens when the moveable frame is respectively located at the positions.

11. The detecting apparatus of claim 10, wherein the optical field distributions of the object are calculated according to the captured images.

12. The detecting apparatus of claim 9, wherein each of the holding units further comprises a shaft for rotating the moveable frame, so that the moveable frame has the positions with respect to the object.

13. The detecting apparatus of claim 9, further comprising:
    a cover in which the screens, the moveable frames, the detecting units and the object are disposed.

14. The detecting apparatus of claim 13, wherein the cover has a track, and the moveable frames move along the track.

15. The detecting apparatus of claim 1, further comprising:
    a rotating unit for carrying and rotating the object so as to change an angle of the object toward the screens or change an angle between the object and an incident light.

16. The detecting apparatus of claim 1, further comprising:
    a rotating unit for carrying and rotating the screen, the detecting units and the holding units so as to change an angle of the object toward the screens.

17. The detecting apparatus of claim 1, further comprising:
    a calculating unit for performing a light intensity correction and conversion of the images captured by the detecting unit and performing a coordinate transform to the same coordinate system.

18. The detecting apparatus of claim 1, further comprising:
    a calculating unit for performing a light intensity correction and conversion of the images captured by the detecting unit, performing a coordinate transform to the same coordinate system, and calculating their total flux.

19. The detecting apparatus of claim 1, wherein when the object is an optical film, each of the detecting units further comprises a light source for emitting a light beam to the optical film.

20. A method for detecting an optical field distribution of an object, which is applied to a detecting apparatus having multiple screens and multiple detecting units, wherein each of the screens is non-electroluminescent and at least partial light-permeable and has a first surface and a second surface opposite to each other, the method comprising the steps of:

positioning the object on a side of the first surface of each screen, and positioning the detecting units corresponding to the object and located on a side of the second surface of each screen, wherein the object is a light source or an optical film;

capturing images of the second surfaces of the screens by the detecting units when a light emitted from the object passes through each screen to reach each detecting unit, while relative distances between each screen, the object and each detecting unit are held fixed;

changing an angle of the object toward each of the screens;

capturing other images of the second surfaces of the screens by the detecting units; and calculating the optical field distributions and a total flux of the object according to the captured images.

21. The method of claim 20, further comprising:
performing calibration and correction for the images captured by the detecting units.

22. The method of claim 20, further comprising:
performing an energy conversion for data of the images, and performing a coordinate transform to the same coordinate system.

23. The method of claim 20, wherein the optical field distributions comprise a light intensity distribution, a color distribution, or a spectrum distribution.

24. The method of claim 20, further comprising:
measuring a standard light source with a known total flux.

25. The method of claim 20, wherein an angle of the object toward each of the screens is changed by a moveable frame and/or a rotating unit.

26. The method of claim 25, wherein the rotating unit carries and rotates the object, or carries and rotates the screens, the detecting units and the moveable frame.

27. The method of claim 20, after calculating the optical field distributions of the object according to the captured images, further comprising:
calculating the total flux by integration.

28. A method for detecting an optical field distribution of an object, which is applied to a detecting apparatus having multiple screens and multiple detecting units, wherein each of the screens is non-electroluminescent and at least partial light-permeable and has a first surface and a second surface opposite to each other, the method comprising the steps of:

positioning the object on a side of the first surface of each screen, and positioning the detecting units corresponding to the object and located on a side of the second surface of each screen, wherein the object is a light source or an optical film;

capturing images of the second surfaces of the screens by the detecting units when a light emitted from the object passes through each screen to reach each detecting unit, while relative distances between each screen, the object and each detecting unit are held fixed;

changing an angle of the object toward each of the screens;

capturing other images of the second surfaces of the screens by the detecting units;

performing an energy conversion for data of the images, and performing a coordinate transform to the same coordinate system; and calculating the optical field distributions and a total flux of the object according to the captured images.

* * * * *